US011921210B2

(12) United States Patent
Crouch et al.

(10) Patent No.: US 11,921,210 B2
(45) Date of Patent: *Mar. 5, 2024

(54) METHOD AND SYSTEM FOR CLASSIFICATION OF AN OBJECT IN A POINT CLOUD DATA SET

(71) Applicant: Aurora Operations, Inc., Pittsburgh, PA (US)

(72) Inventors: Stephen C. Crouch, Bozeman, MT (US); Brant Kaylor, Bozeman, MT (US); Randy R. Reibel, Bozeman, MT (US)

(73) Assignee: Aurora Operations, Inc., Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/959,406

(22) Filed: Oct. 4, 2022

(65) Prior Publication Data

US 2023/0049376 A1 Feb. 16, 2023

Related U.S. Application Data

(63) Continuation of application No. 16/464,063, filed as application No. PCT/US2017/062721 on Nov. 21, 2017, now Pat. No. 11,537,808.

(Continued)

(51) Int. Cl.
*G01S 17/42* (2006.01)
*G01S 7/48* (2006.01)
(Continued)

(52) U.S. Cl.
CPC ............ *G01S 17/42* (2013.01); *G01S 7/4802* (2013.01); *G01S 7/4808* (2013.01); *G01S 17/89* (2013.01);
(Continued)

(58) Field of Classification Search
CPC ...... G06K 9/46; G06K 9/6215; G06K 9/6267; G06K 9/627; G06K 9/6276; G06K 9/628;
(Continued)

(56) References Cited

U.S. PATENT DOCUMENTS 4,099,249 A   7/1978   Casasent
4,620,192 A   10/1986  Collins
(Continued)

FOREIGN PATENT DOCUMENTS

CN   101346773 A   1/2009
CN   102150007 A   8/2011
(Continued)

OTHER PUBLICATIONS

Chester, David B. "A Parameterized Simulation of Doppler Lidar", All Graduate Thesis and Dissertions, Dec. 2017, Issue 6794, <URL: https://digitalcommons.usu.edu/etd/6794 > * pp. 13-14, 27-28, 45*.
(Continued)

*Primary Examiner* — John H Le
(74) *Attorney, Agent, or Firm* — FOLEY & LARDNER LLP

(57) ABSTRACT

A method for classifying an object in a point cloud includes computing first and second classification statistics for one or more points in the point cloud. Closest matches are determined between the first and second classification statistics and a respective one of a set of first and second classification statistics corresponding to a set of N classes of a respective first and second classifier, to estimate the object is in a respective first and second class. If the first class does not correspond to the second class, a closest fit is performed between the point cloud and model point clouds for only the first and second classes of a third classifier. The object is assigned to the first or second class, based on the closest fit (Continued)

within near real time of receiving the 3D point cloud. A device is operated based on the assigned object class.

20 Claims, 18 Drawing Sheets

Related U.S. Application Data

(60) Provisional application No. 62/427,573, filed on Nov. 29, 2016.

(51) Int. Cl.
*G01S 17/89* (2020.01)
*G06F 18/22* (2023.01)
*G06F 18/2413* (2023.01)
*G06F 18/2431* (2023.01)
*G06V 10/40* (2022.01)
*G06V 10/74* (2022.01)
*G06V 10/75* (2022.01)
*G06V 10/764* (2022.01)
*G06V 20/64* (2022.01)

(52) U.S. Cl.
CPC ........ *G06F 18/22* (2023.01); *G06F 18/24147* (2023.01); *G06F 18/2431* (2023.01); *G06V 10/40* (2022.01); *G06V 10/7515* (2022.01); *G06V 10/761* (2022.01); *G06V 10/764* (2022.01); *G06V 20/64* (2022.01)

(58) Field of Classification Search
CPC .... G01S 7/4802; G01S 7/4808; G01S 7/4814; G01S 7/4816; G01S 7/497; G01S 17/26; G01S 17/42; G01S 17/89; G06V 10/40; G06V 10/7515; G06V 20/64; G06V 10/761; G06V 10/764; G06F 18/22; G06F 18/2431; G06F 18/24147
USPC ........................................................ 702/159
See application file for complete search history.

(56) References Cited

U.S. PATENT DOCUMENTS

| | | | |
|---|---|---|---|
| 4,648,276 A | 3/1987 | Klepper et al. |
| 4,804,893 A | 2/1989 | Melocik |
| 5,075,864 A | 12/1991 | Sakai |
| 5,216,534 A | 6/1993 | Boardman et al. |
| 5,223,986 A | 6/1993 | Mayerjak et al. |
| 5,227,910 A | 7/1993 | Khattak |
| 5,231,401 A | 7/1993 | Kaman et al. |
| 5,687,017 A | 11/1997 | Katoh et al. |
| 5,781,156 A | 7/1998 | Krasner |
| 5,828,585 A | 10/1998 | Welk et al. |
| 5,947,903 A | 9/1999 | Ohtsuki et al. |
| 5,999,302 A | 12/1999 | Sweeney et al. |
| 6,029,496 A | 2/2000 | Kreft |
| 6,211,888 B1 | 4/2001 | Ohtsuki et al. |
| 6,671,595 B2 | 12/2003 | Lu et al. |
| 6,753,950 B2 | 6/2004 | Morcom |
| 6,871,148 B2 | 3/2005 | Morgen et al. |
| 6,931,055 B1 | 8/2005 | Underbrink et al. |
| 7,122,691 B2 | 10/2006 | Oshima et al. |
| 7,152,490 B1 | 12/2006 | Freund et al. |
| 7,486,802 B2 | 2/2009 | Hougen |
| 7,511,824 B2 | 3/2009 | Sebastian et al. |
| 7,639,347 B2 | 12/2009 | Eaton |
| 7,742,152 B2 | 6/2010 | Hui et al. |
| 7,917,039 B1 | 3/2011 | Delfyett |
| 8,135,513 B2 | 3/2012 | Bauer et al. |
| 8,531,650 B2 | 9/2013 | Feldkhun et al. |
| 8,751,155 B2 | 6/2014 | Lee |
| 8,805,197 B2 | 8/2014 | Delfyett |
| 8,818,609 B1 | 8/2014 | Boyko et al. |
| 8,831,780 B2 | 9/2014 | Zelivinski et al. |
| 8,954,252 B1 | 2/2015 | Urmson et al. |
| 9,041,915 B2 | 5/2015 | Earhart et al. |
| 9,046,909 B2 | 6/2015 | Leibowitz et al. |
| 9,086,273 B1 | 7/2015 | Gruver et al. |
| 9,097,800 B1 | 8/2015 | Zhu |
| 9,348,137 B2 | 5/2016 | Plotkin et al. |
| 9,383,753 B1 | 7/2016 | Templeton et al. |
| 9,607,220 B1 | 3/2017 | Smith et al. |
| 9,618,742 B1 | 4/2017 | Droz et al. |
| 9,753,462 B2 | 9/2017 | Gilliland et al. |
| 10,036,812 B2 | 7/2018 | Crouch et al. |
| 10,231,705 B2 | 3/2019 | Lee |
| 10,345,434 B2 | 7/2019 | Hinderling et al. |
| 10,422,649 B2 | 9/2019 | Engelman et al. |
| 10,485,508 B2 | 11/2019 | Miyaji et al. |
| 10,520,602 B2 | 12/2019 | Villeneuve et al. |
| 10,534,084 B2 | 1/2020 | Crouch et al. |
| 10,568,258 B2 | 2/2020 | Wahlgren |
| 10,571,567 B2 | 2/2020 | Campbell et al. |
| 11,002,856 B2 | 5/2021 | Heidrich et al. |
| 11,041,954 B2 | 6/2021 | Crouch et al. |
| 11,249,192 B2 | 2/2022 | Crouch et al. |
| 11,402,506 B2 | 8/2022 | Ohtomo et al. |
| 11,441,899 B2 | 9/2022 | Pivac et al. |
| 11,537,808 B2 * | 12/2022 | Crouch ............... G01S 7/4802 |
| 2002/0071109 A1 | 6/2002 | Allen et al. |
| 2002/0140924 A1 | 10/2002 | Wangler et al. |
| 2003/0117312 A1 | 6/2003 | Nakanishi et al. |
| 2004/0034304 A1 | 2/2004 | Sumi |
| 2004/0109155 A1 | 6/2004 | Deines |
| 2004/0158155 A1 | 8/2004 | Njemanze |
| 2004/0222366 A1 | 11/2004 | Frick |
| 2005/0149240 A1 | 7/2005 | Tseng et al. |
| 2006/0132752 A1 | 6/2006 | Kane |
| 2006/0239312 A1 | 10/2006 | Kewitsch et al. |
| 2007/0005212 A1 | 1/2007 | Xu et al. |
| 2008/0018881 A1 | 1/2008 | Hui et al. |
| 2008/0024756 A1 | 1/2008 | Rogers |
| 2008/0040029 A1 | 2/2008 | Breed |
| 2008/0100822 A1 | 5/2008 | Munro |
| 2009/0002679 A1 | 1/2009 | Ruff et al. |
| 2009/0009842 A1 | 1/2009 | Destain et al. |
| 2009/0030605 A1 | 1/2009 | Breed |
| 2010/0094499 A1 | 4/2010 | Anderson |
| 2010/0183309 A1 | 7/2010 | Etemad et al. |
| 2010/0188504 A1 | 7/2010 | Dimsdale et al. |
| 2010/0312432 A1 | 12/2010 | Hamada et al. |
| 2011/0007299 A1 | 1/2011 | Moench et al. |
| 2011/0015526 A1 | 1/2011 | Tamura |
| 2011/0026007 A1 | 2/2011 | Gammenthaler |
| 2011/0026008 A1 | 2/2011 | Gammenthaler |
| 2011/0205523 A1 | 8/2011 | Rezk et al. |
| 2011/0292371 A1 | 12/2011 | Chang |
| 2012/0038902 A1 | 2/2012 | Dotson |
| 2012/0127252 A1 | 5/2012 | Lim et al. |
| 2012/0229627 A1 | 9/2012 | Wang |
| 2012/0274922 A1 | 11/2012 | Hodge |
| 2012/0281907 A1 | 11/2012 | Samples et al. |
| 2012/0306383 A1 | 12/2012 | Munro |
| 2013/0120989 A1 | 5/2013 | Sun et al. |
| 2013/0268163 A1 | 10/2013 | Comfort et al. |
| 2013/0325244 A1 | 12/2013 | Wang et al. |
| 2014/0036252 A1 | 2/2014 | Amzajerdian et al. |
| 2014/0064607 A1 | 3/2014 | Grossmann et al. |
| 2015/0005993 A1 | 1/2015 | Breuing |
| 2015/0046119 A1 | 2/2015 | Sandhawalia et al. |
| 2015/0130607 A1 | 5/2015 | MacArthur |
| 2015/0160332 A1 | 6/2015 | Sebastian et al. |
| 2015/0177379 A1 | 6/2015 | Smith et al. |
| 2015/0185244 A1 | 7/2015 | Inoue et al. |
| 2015/0260836 A1 | 9/2015 | Hayakawa |
| 2015/0267433 A1 | 9/2015 | Leonessa et al. |
| 2015/0269438 A1 | 9/2015 | Samarasekera et al. |
| 2015/0270838 A1 | 9/2015 | Chan et al. |
| 2015/0282707 A1 | 10/2015 | Tanabe et al. |
| 2015/0323660 A1 | 11/2015 | Hampikian |
| 2015/0331103 A1 | 11/2015 | Jensen |

(56) References Cited

U.S. PATENT DOCUMENTS

| | | |
|---|---|---|
| 2015/0331111 A1 | 11/2015 | Newman et al. |
| 2016/0078303 A1 | 3/2016 | Samarasekera et al. |
| 2016/0084946 A1 | 3/2016 | Turbide |
| 2016/0091599 A1 | 3/2016 | Jenkins |
| 2016/0123720 A1 | 5/2016 | Thorpe et al. |
| 2016/0125739 A1 | 5/2016 | Stewart et al. |
| 2016/0216366 A1 | 7/2016 | Phillips et al. |
| 2016/0245903 A1 | 8/2016 | Kalscheur et al. |
| 2016/0260324 A1 | 9/2016 | Tummala et al. |
| 2016/0266243 A1 | 9/2016 | Marron |
| 2016/0274589 A1 | 9/2016 | Templeton et al. |
| 2016/0350926 A1 | 12/2016 | Flint et al. |
| 2016/0377721 A1 | 12/2016 | Lardin et al. |
| 2016/0377724 A1 | 12/2016 | Crouch et al. |
| 2017/0160541 A1 | 6/2017 | Carothers et al. |
| 2017/0248691 A1 | 8/2017 | McPhee et al. |
| 2017/0299697 A1 | 10/2017 | Swanson |
| 2017/0329014 A1 | 11/2017 | Moon et al. |
| 2017/0329332 A1 | 11/2017 | Pilarski et al. |
| 2017/0343652 A1 | 11/2017 | De Mersseman et al. |
| 2017/0350964 A1 | 12/2017 | Kaneda |
| 2017/0350979 A1 | 12/2017 | Uyeno et al. |
| 2017/0356983 A1 | 12/2017 | Jeong et al. |
| 2018/0003805 A1 | 1/2018 | Popovich et al. |
| 2018/0136000 A1 | 5/2018 | Rasmusson et al. |
| 2018/0188355 A1 | 7/2018 | Bao et al. |
| 2018/0224547 A1 | 8/2018 | Crouch et al. |
| 2018/0267556 A1 | 9/2018 | Templeton et al. |
| 2018/0276986 A1 | 9/2018 | Delp |
| 2018/0284286 A1 | 10/2018 | Eichenholz et al. |
| 2018/0299534 A1 | 10/2018 | Lachapelle et al. |
| 2018/0307913 A1 | 10/2018 | Finn et al. |
| 2019/0064831 A1 | 2/2019 | Gali et al. |
| 2019/0086514 A1 | 3/2019 | Dussan et al. |
| 2019/0107606 A1 | 4/2019 | Russell et al. |
| 2019/0154439 A1 | 5/2019 | Binder |
| 2019/0154816 A1 | 5/2019 | Hughes et al. |
| 2019/0154832 A1 | 5/2019 | Maleki et al. |
| 2019/0154835 A1 | 5/2019 | Maleki et al. |
| 2019/0258251 A1 | 8/2019 | Ditty et al. |
| 2019/0317219 A1 | 10/2019 | Smith et al. |
| 2019/0318206 A1 | 10/2019 | Smith et al. |
| 2019/0346856 A1 | 11/2019 | Berkemeier et al. |
| 2019/0361119 A1 | 11/2019 | Kim et al. |
| 2020/0025879 A1 | 1/2020 | Pacala et al. |
| 2020/0049819 A1 | 2/2020 | Cho et al. |
| 2021/0089047 A1 | 3/2021 | Smith et al. |
| 2021/0165102 A1 | 6/2021 | Crouch et al. |
| 2021/0325664 A1 | 10/2021 | Adams et al. |
| 2022/0260686 A1 | 8/2022 | Wang et al. |
| 2022/0413260 A1 | 12/2022 | Gassend et al. |
| 2023/0025474 A1 | 1/2023 | Baker et al. |

FOREIGN PATENT DOCUMENTS

| | | |
|---|---|---|
| CN | 103227559 A | 7/2013 |
| CN | 104793619 A | 7/2015 |
| CN | 104956400 A | 9/2015 |
| CN | 105425245 A | 3/2016 |
| CN | 105629258 A | 6/2016 |
| CN | 105652282 A | 6/2016 |
| CN | 107015238 A | 8/2017 |
| CN | 107193011 A | 9/2017 |
| CN | 207318710 U | 5/2018 |
| DE | 10 2007 001 103 A1 | 7/2008 |
| DE | 10 2017 200 692 A1 | 8/2018 |
| EP | 1 298 453 A2 | 4/2003 |
| EP | 1 298 453 B1 | 4/2003 |
| EP | 2 243 042 B1 | 10/2010 |
| EP | 3 330 766 A1 | 6/2018 |
| GB | 2 349 231 A | 10/2000 |
| JP | S63-071674 A | 4/1988 |
| JP | H06-148556 A | 5/1994 |
| JP | H09-257415 A | 10/1997 |
| JP | 2765767 B2 | 6/1998 |
| JP | H11-153664 A | 6/1999 |
| JP | 2000-338244 A | 12/2000 |
| JP | 2002-249058 A | 9/2002 |
| JP | 3422720 B2 | 6/2003 |
| JP | 2003-185738 A | 7/2003 |
| JP | 2006-148556 A | 6/2006 |
| JP | 2006-226931 A | 8/2006 |
| JP | 2007-155467 A | 6/2007 |
| JP | 2007-214564 A | 8/2007 |
| JP | 2007-214694 A | 8/2007 |
| JP | 2009-257415 A | 11/2009 |
| JP | 2009-291294 A | 12/2009 |
| JP | 2011-044750 A | 3/2011 |
| JP | 2011-107165 A | 6/2011 |
| JP | 2011-203122 A | 10/2011 |
| JP | 2012-502301 A | 1/2012 |
| JP | 2012-103118 A | 5/2012 |
| JP | 2012-154863 A | 8/2012 |
| JP | 2015-125062 A | 7/2015 |
| JP | 2015-172510 A | 10/2015 |
| JP | 2015-212942 A | 11/2015 |
| JP | 2018-204970 A | 12/2018 |
| KR | 2018-0058068 A | 5/2018 |
| KR | 2018-0126927 A | 11/2018 |
| TW | 201516612 A | 5/2015 |
| TW | 201818183 A | 5/2018 |
| TW | 201832039 A | 9/2018 |
| TW | 201833706 A | 9/2018 |
| TW | 202008702 A | 2/2020 |
| WO | WO-2007/124063 A2 | 11/2007 |
| WO | WO-2010/127151 A2 | 11/2010 |
| WO | WO-2011/102130 A1 | 8/2011 |
| WO | WO-2014/132020 A1 | 9/2014 |
| WO | WO-2015/037173 A1 | 3/2015 |
| WO | WO-2016/134321 A1 | 8/2016 |
| WO | WO-2016/164435 A1 | 10/2016 |
| WO | WO-2017/018065 A1 | 2/2017 |
| WO | WO-2018/066069 A1 | 4/2018 |
| WO | WO-2018/067158 A1 | 4/2018 |
| WO | WO-2018/102188 A1 | 6/2018 |
| WO | WO-2018/102190 A1 | 6/2018 |
| WO | WO-2018/107237 A1 | 6/2018 |
| WO | WO-2018/125438 A2 | 7/2018 |
| WO | WO-2018/144853 A1 | 8/2018 |
| WO | WO-2018/160240 A2 | 9/2018 |
| WO | WO-2019/014177 A1 | 1/2019 |
| WO | WO-2020/062301 A1 | 4/2020 |

OTHER PUBLICATIONS

Notice of Reasons of Rejection issued in connection with JP Appl. Ser. No. 2022-000212 dated Feb. 7, 2023.

Adany, P. et al., "Chirped Lidar Using Simplified Homodyne Detection," Journal of Lightwave Technology, vol. 27, No. 16, Aug. 15, 2009, pp. 3351-3357.

Anonymous, "Fundamentals of Direct Digital Synthesis," Analog Devices, MT-085 Tutorial Rev. D, copyright 2009, pp. 1-9.

Anonymous, "Occlusion—Shadows and Occlusion—Peachpit", Jul. 3, 2006 (Jul. 3, 2006), P055697780,Retrieved from the Internet: URL:https://www.peachpit.com/articles/article.aspx?p=486505&seqNum=7[retrieved on May 25, 2020] 2 pages.

Aull, B. et al., "Geiger-Mode Avalanche Photodiodes for Three-Dimensional Imaging," Lincoln Laboratory Journal, vol. 13, No. 2, 2002, pp. 335-350.

Bashkansky, M. et al., "RF phase-coded random-modulation LIDAR," Optics Communications, vol. 231, 2004, pp. 93-98.

Beck, S. et al., "Synthetic-aperture imaging laser radar: laboratory demonstration and signal processing," Applied Optics, vol. 44, No. 35, Dec. 10, 2005, pp. 7621-7629.

Berkovic, G. and Shafir, E., "Optical methods for distance and displacement measurements", Advances in Optics and Photonics, vol. 4, Issue 4, Dec. 2012, pp. 441-471.

Besl, P. and McKay, N., "A Method for Registration of 3-D shapes", IEEE Transactions on Pattern Analysis and Machine Intelligence, vol. 14, No. 2, Feb. 1992, pp. 239-256.

(56) References Cited

OTHER PUBLICATIONS

Campbell, J. et al., "Super-resolution technique for CW lidar using Fourier transform reordering and Richardson-Lucy deconvolution." Optics Letters, vol. 39, No. 24, Dec. 15, 2014, pp. 6981-6984.
Cao, X. et al., "Lidar Signal Depolarization by Solid Targets and its Application to Terrain Mapping and 3D Imagery," Defence R&D, Contract Report DRDC Valcartier CR 2011-236, Mar. 2011, retrieved at URL:http://publications.gc.ca/collections/collection_2016/rddc-drdc/D68-3-236-2011-eng.pdf, pp. 1-74.
Cheng, H., "Autonomous Intelligent Vehicles: Theory, Algorithms, and Implementation", copyright 2011, Springer, retrieved from http://ebookcentral.proquest.com, created from epo-ebooks on Jun. 1, 2020, 24 pages.
Chinese Office Action on CN Appl. Ser. No. 201880009947.5 dated Oct. 11, 2021 (5 pages).
Contu, F., "The Do's and Don'ts of High Speed Serial Design in FPGA's". Xilinix All Programmable, Copyright 2013, High Speed Digital Design & Validation Seminars 2013, pp. 1-61.
Crouch, S. and Barber, Z., "Laboratory demonstrations of interferometric and spotlight synthetic aperture ladar techniques," Optics Express, vol. 20, No. 22, Oct. 22, 2012, pp. 24237-24246.
Crouch, S. et al., "Three dimensional digital holographic aperture synthesis", Optics Express, vol. 23, No. 18, Sep. 7, 2015, pp. 23811-23816.
Dapore, B. et al., "Phase noise analysis of two wavelength coherent imaging system", Optics Express, vol. 21, No. 25, Dec. 16, 2013, pp. 30642-30652.
Decision of Rejection on JP Appl. Ser. No. 2019-527155 dated Jun. 8, 2021 (8 pages).
Decision of Rejection on JP Appl. Ser. No. 2020-559530 dated Aug. 31, 2021 (13 pages).
Duncan, B. and Dierking, M., "Holographic aperture ladar: erratum", Applied Optics, vol. 52, No. 4, Feb. 1, 2013, pp. 706-708.
Duncan, B. et al., "Holographic aperture ladar", Applied Optics, vol. 48, Issue 6, Feb. 20, 2009, pp. 1168-1177.
El Gayar, N. (Ed.) et al., "Multiple Classifier Systems", 9th International Workshop, International Workshop on Multiple Classifier Systems, MCS 2010, Cairo, Egypt, Apr. 7-9, 2010, specifically Farhad Samadzadegan et al., "A Multiple Classifier System for Classification of LIDAR Remote Sensing Data Using Multi-class SVM", pp. 254-263 (337 total pages).
European Office Action on EP 17876731.5 dated Feb. 21, 2022 (5 pages).
Examination Report on EP Appl. Ser. No. 17898933.1 dated May 25, 2022 (5 pages).
Examination Report on EP Appl. Ser. No. 19791789.1 dated Dec. 21, 2021 (12 pages).
Extended European Search Report on EP Appl. Ser. No. 17876081.5 dated Jun. 3, 2020 (9 pages).
Extended European Search Report on EP Appl. Ser. No. 17876731.5 dated Jun. 17, 2020 (14 pages).
Extended European Search Report on EP Appl. Ser. No. 17888807.9 dated Jun. 3, 2020 (9 pages).
Extended European Search Report on EP Appl. Ser. No. 17898933.1 dated May 12, 2020 (7 pages).
Farhad Samadzadegan et al., "A Multiple Classifier System for Classification of LIDAR Remote Sensing Data Using Multi-class SVM", International Workshop on Multiple Classifier Systems, MCS 2010, Lecture Notes in Computer Science, 2010, vol. 5997, pp. 254-263.
Fehr, D. et al., "Compact Covariance descriptors in 3D point clouds for object recognition," presented at the Robotics and Automation (ICRA), May 14, 2012, IEEE International Conference, pp. 1793-1798.
Final Office Action on U.S. Appl. No. 16/464,657 dated Jun. 30, 2022.
Final Office Action on U.S. Appl. No. 16/725,399 dated Aug. 26, 2020 (57 pages).
Final Rejection on U.S. Appl. No. 17/167,857 dated Oct. 25, 2021 (46 pages).
Final US Office Action on U.S. Appl. No. 17/331,362 dated Nov. 29, 2021 (17 pages).
First Office Action on CN Appl. Ser. No. 201780081215.2 dated Mar. 3, 2021 (14 pages).
First Office Action on CN Appl. Ser. No. 201780081968.3 dated Dec. 3, 2020 (6 pages).
First Office Action on CN Appl. Ser. No. 201980033898.3 dated Apr. 20, 2021 (14 pages).
Foucras, M. et al., "Detailed Analysis of the Impact of the Code Doppler on the Acquisition Performance of New GNSS Signals," ION ITM, International Technical Meeting of The Institute of Navigation, San Diego, California, Jan. 27, 2014, pp. 1-13.
Griggs, R.(Ed.), "Implementation Agreement for Integrated Dual Polarization Micro-Intradyne Coherent Receivers", OIF (Optical Internetworking Forum), IA# OIF-DPC-MRX-01.0, Mar. 31, 2015, pp. 1-32.
Haralick, R. et al., "Image Analysis Using Mathematical Morphology," IEEE Transactions in Pattern Analysis and Machine Intelligence, Jul. 1987, vol. PAMI-9, No. 4, pp. 532-550.
International Preliminary Report and Written Opinion on Patentability on Appl. Ser. No. PCT/US2018/041388 dated Jan. 23, 2020 (12 pages).
International Preliminary Report and Written Opinion on Patentability on Appl. Ser. No. PCT/US2019/028532 dated Oct. 27, 2020 (11 pages).
International Preliminary Report and Written Opinion on Patentability on Appl. Ser. No. PCT/US2019/068351 dated Jul. 15, 2021 (8 pages).
International Search Report and Written Opinion on Appl. Ser. No. PCT/US2017/062703 dated Aug. 27, 2018 (13 pages).
International Search Report and Written Opinion on Appl. Ser. No. PCT/US2017/062708 dated Mar. 16, 2018 (14 pages).
International Search Report and Written Opinion on Appl. Ser. No. PCT/US2017/062714 dated Aug. 23, 2018 (13 pages).
International Search Report and Written Opinion on Appl. Ser. No. PCT/US2017/062721 dated Feb. 6, 2018 (12 pages).
International Search Report and Written Opinion on Appl. Ser. No. PCT/US2018/016632 dated Apr. 24, 2018 (6 pages).
International Search Report and Written Opinion on Appl. Ser. No. PCT/US2018/041388 dated Sep. 20, 2018 (13 pages).
International Search Report and Written Opinion on Appl. Ser. No. PCT/US2018/044007 dated Oct. 25, 2018 (17 pages).
International Search Report and Written Opinion on Appl. Ser. No. PCT/US2019/028532 dated Aug. 16, 2019 (16 pages).
International Search Report and Written Opinion on Appl. Ser. No. PCT/US2019/068351 dated Apr. 9, 2020 (14 pages).
International Search Report and Written Opinion on Appl. Ser. No. PCT/US2021/032515 dated Aug. 3, 2021 (18 pages).
Johnson, A. et al., "Using spin images for efficient object recognition in cluttered 3D scenes", IEEE Trans. Pattern Anal. Mach. Intell., vol. 21, No. 5, May 1999, pp. 433-448.
Johnson, A., "Spin-Images: A Representation for 3-D Surface Matching," doctoral dissertation, tech. report CMU-RI-TR-97-47, Robotics Institute, Carnegie Mellon University, Aug. 1997, 308 pages.
Kachelmyer, A., "Range-Doppler Imaging with a Laser Radar", The Lincoln Laboratory Journal, vol. 3, No. 1, 1990, pp. 87-118.
Klasing, K. et al., "Comparison of Surface Normal Estimation Methods for Range Sensing Applications," 2009 IEEE International Conference on Robotics and Automation, May 12, 2009, pp. 3206-3211.
Krause, B. et al., "Motion compensated frequency modulated continuous wave 3D coherent imaging ladar with scannerless architecture", Applied Optics, vol. 51, No. 36, Dec. 20, 2012, pp. 8745-8761.
Le, T., "Arbitrary Power Splitting Couplers Based on 3x3 Multimode Interference Structures for All-Optical Computing", LACSIT International Journal of Engineering and Technology, vol. 3, No. 5, Oct. 2011, pp. 565-569.
Lin, C. et al.; "Eigen-feature analysis of weighted covariance matrices for LiDAR point cloud classification", ISPRS Journal of Photogrammetry and Remote Sensing, vol. 94, Aug. 1, 2014 (30 pages).

(56) References Cited

OTHER PUBLICATIONS

Lu et al., "Recognizing objects in 3D point clouds with multi-scale features", Sensors 2014, 14, 24156-24173; doi: 10.3390/s141224156 (Year: 2014).

Lu, M. et al., "Recognizing Objects in 3D Point Clouds with Multi-Scale Local Features," Sensors 2014, Dec. 15, 2014, retrieved at URL:www.mdpi.com/1424-8220/14/12/24156/pdf, pp. 24156-24173.

MacKinnon, D. et al., "Adaptive laser range scanning", American Control Conference, Piscataway, NJ, 2008, pp. 3857-3862.

Marron, J. et al., "Three-dimensional Lensless Imaging Using Laser Frequency Diversity", Applied Optics, vol. 31, No. 2, Jan. 10, 1992, pp. 255-262.

Miyasaka, T. et al., "Moving Object Tracking and Identification in Traveling Environment Using High Resolution Laser Radar", Graphic Information Industrial, vol. 43, No. 2, pp. 61-69, Feb. 1, 2011.

Monreal, J. et al., "Detection of Three Dimensional Objects Based on Phase Encoded Range Images", Sixth International Conference on Correlation Optics, vol. 5477, Jun. 4, 2004, pp. 269-280.

Munkres, J., "Algorithms for the Assignment and Transportation Problems", Journal of the Society for Industrial and Applied Mathematics, vol. 5, No. 1, Mar. 1957, pp. 32-38.

Non-Final Office Action on U.S. Appl. No. 16/464,063 dated Apr. 22, 2022 (23 pages).

Non-Final Office Action on U.S. Appl. No. 16/464,648 dated Jun. 1, 2021 (6 pages).

Non-Final Office Action on U.S. Appl. No. 16/464,657 dated Dec. 22, 2021 (17 pages).

Non-Final Office Action on U.S. Appl. No. 16/535,127 dated Jun. 3, 2022 (6 pages).

Non-Final Office Action on U.S. Appl. No. 16/725,399 dated Mar. 5, 2020 (53 pages).

Non-Final Office Action on U.S. Appl. No. 17/167,857 dated Apr. 6, 2022 (50 pages).

Notice of Allowance for U.S. Appl. No. 16/725,399 dated Dec. 3, 2020 (11 pages).

Notice of Allowance on KR Appl. Ser. No. 10-2019-7019062 dated Feb. 10, 2021 (4 Pages).

Notice of Allowance on KR Appl. Ser. No. 10-2019-7019076 dated Feb. 15, 2021 (4 pages).

Notice of Allowance on KR Appl. Ser. No. 10-2019-7019078 dated Feb. 15, 2021 (4 pages).

Notice of Allowance on U.S. Appl. No. 16/464,063 dated Aug. 9, 2022.

Notice of Allowance on U.S. Appl. No. 17/167,857 dated Aug. 8, 2022.

Notice of Allowance on U.S. Appl. No. 17/167,857 dated Aug. 24, 2022.

Notice of Allowance on U.S. Appl. No. 15/423,978 dated Jul. 15, 2019 (8 pages).

Notice of Allowance on U.S. Appl. No. 15/645,311 dated Apr. 18, 2019 (13 pages).

Notice of Allowance on U.S. Appl. No. 16/515,538 dated Feb. 23, 2021 (16 pages).

Notice of Final Rejection for KR Appl. Ser. No. 10-2021-7019744 dated Jan. 25, 2022 (3 pages).

Notice of Preliminary Rejection on KR Appl. Ser. No. 10-2021-7014545 dated Aug. 19, 2021 (17 pages).

Notice of Preliminary Rejection on KR Appl. Ser. No. 10-2021-7014560 dated Aug. 19, 2021 (5 pages).

Notice of Preliminary Rejection on KR Appl. Ser. No. 10-2021-7019744 dated Aug. 19, 2021 (15 pages).

Notice of Reasons for Refusal on JP Appl. Ser. No. 2019-527156 dated Dec. 1, 2020 (12 pages).

Notice of Reasons for Refusal on JP Appl. Ser. No. 2020-559530 dated Apr. 20, 2021 (11 pages).

Notice of Reasons for Refusal on JP Appl. Ser. No. 2021-118743 dated Jun. 7, 2022 (9 pages).

Notice of Reasons for Refusal on JP Appl. Ser. No. 2021-165072 dated Apr. 19, 2022 (10 pages).

Notice of Reasons for Refusal on JP Appl. Ser. No. 2021-165072 dated Nov. 30, 2021 (9 pages).

Notice of Reasons for Refusal on JP Appl. Ser. No. 2021-538998 dated Apr. 26, 2022 (11 pages).

Notice of Reasons for Refusal on JP Appl. Ser. No. 2021-538998 dated Nov. 30, 2021 (20 pages).

Notice of Reasons for Rejection issued in connection with JP Appl. Ser. No. JP 2021-126516 dated Jun. 21, 2022 (16 pages).

O'Donnell, R., "Radar Systems Engineering Lecture 11 Waveforms and Pulse Compression," IEEE New Hampshire Section, Jan. 1, 2010, pp. 1-58.

Office Action for U.S. Appl. No. 17/167,857 dated Jun. 28, 2021 (37 pages).

Office Action on JP App. Ser. No. 2019-527155 dated Dec. 1, 2020 (10 pages).

Office Action on JP Appl. Ser. No. 2019-527155 dated Dec. 1, 2020 (8 pages).

Office Action on JP Appl. Ser. No. 2019-527224 dated Dec. 1, 2020 (6 pages).

Office Action on JP Appl. Ser. No. 2019-538482 dated Feb. 2, 2021 (6 pages).

Office Action on KR Appl. Ser. No. 10-2019-7018575 dated Jun. 23, 2020 (4 pages).

Office Action on KR Appl. Ser. No. 10-2019-7019062 dated Oct. 5, 2020 (6 pages).

Office Action on KR Appl. Ser. No. 10-2019-7019076 dated Jun. 9, 2020 (18 pages).

Office Action on KR Appl. Ser. No. 10-2019-7019078 dated Jun. 9, 2020 (14 pages).

Office Action on KR Appl. Ser. No. 10-2019-7022921 dated Aug. 26, 2020 (6 pages).

Office Action on U.S. Appl. No. 15/423,978 dated Mar. 22, 2019 (6 pages).

Office Action on U.S. Appl. No. 17/331,362 dated Aug. 19, 2021 (17 pages).

Optoplex Corporation, "90 degree Optical Hybrid", Nov. 9, 2016, 2 pages.

Rabb, D. et al., "Multi-transmitter Aperture Synthesis", Optics Express, vol. 18, No. 24, Nov. 22, 2010, pp. 24937-24945.

Roos, P. et al., "Ultrabroadband optical chirp linearization for precision metrology applications", Optics Letters, vol. 34, No. 23, Dec. 1, 2009, pp. 3692-3694.

Salehian, H. et al., "Recursive Estimation of the Stein Center of SPD Matrices and its Applications", 2013 IEEE International Conference on Computer Vision (ICCV), Dec. 1, 2013, pp. 1793-1800.

Samadzadegan, F. et al., "A Multiple Classifier System for Classification of LIDAR Remote Sensing Data Using Multi-class SVM", Multiple Classifier Systems, 9th International Workshop, MCS 2010, Cairo, Egypt, Apr. 7-9, 2010, pp. 254-263.

Satyan, N. et al., "Precise control of broadband frequency chirps using optoelectronic feedback", Optics Express, vol. 17, No. 18, Aug. 31, 2009, pp. 15991-15999.

Second Chinese Office Action on CN Appl. Ser. No. 201880009947.5 dated Apr. 4, 2022 (3 pages).

Second Chinese Office Action on CN Appl. Ser. No. 201980033898.3 dated Oct. 27, 2021 (6 pages).

Second Office Action for KR Appl. Ser. No. 10-2021-7020076 dated Jun. 30, 2021 (5 pages).

Second Office Action on CN Appl. Ser. No. 201780081968.3 dated May 12, 2021 (7 pages).

Stafford, J. et al., "Holographic aperture ladar with range compression," Journal of the Optical Society of America, vol. 34, No. 5, May 2017, pp. A1-A9.

Supplementary European Search Report on EP Appl. Ser. No. 18748729.3 dated Nov. 20, 2020 (8 pages).

Supplementary European Search Report on EP Appl. Ser. No. 18831205.2 dated Feb. 12, 2021 (7 pages).

Supplementary European Search Report on EP Appl. Ser. No. 19791789.1 dated Dec. 9, 2021 (4 pages).

Third Party Submission on U.S. Appl. No. 16/725,375, filed Jun. 25, 2020 (73 pages).

(56) References Cited

OTHER PUBLICATIONS

Tippie, A. et al., "High-resolution synthetic-aperture digital holography with digital phase and pupil correction", Optics Express, vol. 19, No. 13, Jun. 20, 2011, pp. 12027-12038.

U.S. Notice of Allowance on US dated Sep. 14, 2022.

U.S. Notice of Allowance on U.S. Appl. No. 17/331,362 dated Feb. 17, 2022 (14 pages).

Weinmann, M. et al., "Semantic point cloud interpretation based on optimal neighborhoods, relevant features and efficient classifiers", ISPRS Journal of Photogrammetry and Remote Sensing, vol. 105, Feb. 27, 2015, pp. 286-304.

Wikipedia, "Digital-to-analog converter", retrieved from https://en.wikipedia.org/wiki/Digital-to-analog_converter, on Apr. 15, 2017, 7 pages.

Wikipedia, "Field-programmable gate array", retrieved from https://en.wikipedia.org/wiki/Field-programmable_gate_array, on Apr. 15, 2017, 13 pages.

Wikipedia, "In-phase and quadrature components", retrieved from https://en.wikipedia.org/wiki/In-phase_and_quadrature_components, on Jan. 26, 2018, 3 pages.

Wikipedia, "Phase-shift keying", retrieved from https://en.wikipedia.org/wiki/Phase-shift_keying#Binary_phase-shift_keying.28BPSK.29, on Oct. 23, 2016, 9 pages.

Ye, J., "Least Squares Linear Discriminant Analysis", 24th International Conference on Machine Learning, pp. 1087-1093 (as of Nov. 27, 2016).

Korean Office Action issued in connection with KR Appl. Ser. No. 10-2021-7023519 dated Feb. 13, 2023.

Extended European Search Report issued in connection with EP Appl. No. 23189916.2 dated Nov. 9, 2023.

Stamatis et al.,"3D automatic target recognition for future LIDAR missiles", Dec. 2016, IEEE Transactions on Aerospace and Electronic Systems 52(6):2662-2675, DOI:10.1109/TAES.2016.150300.

* cited by examiner

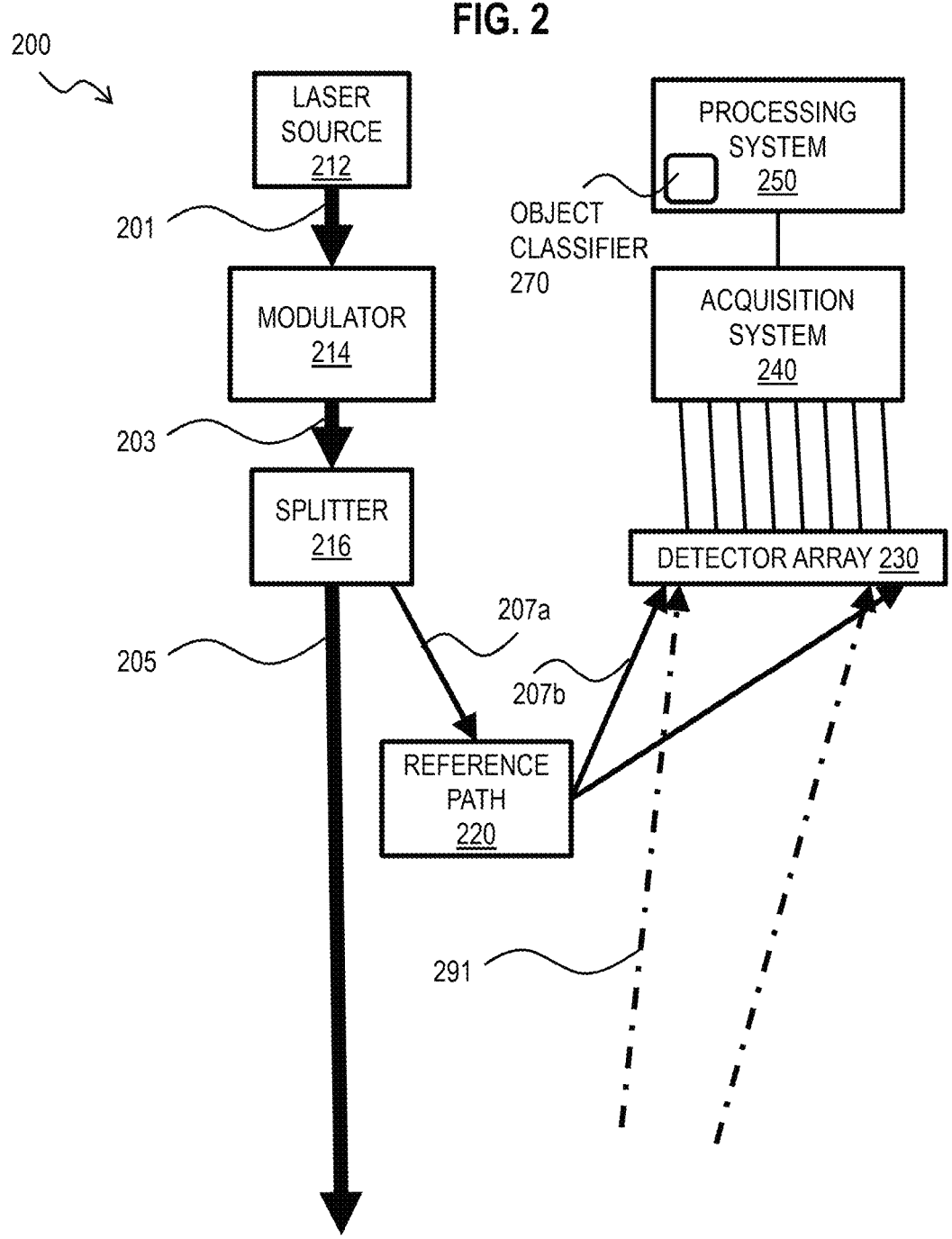

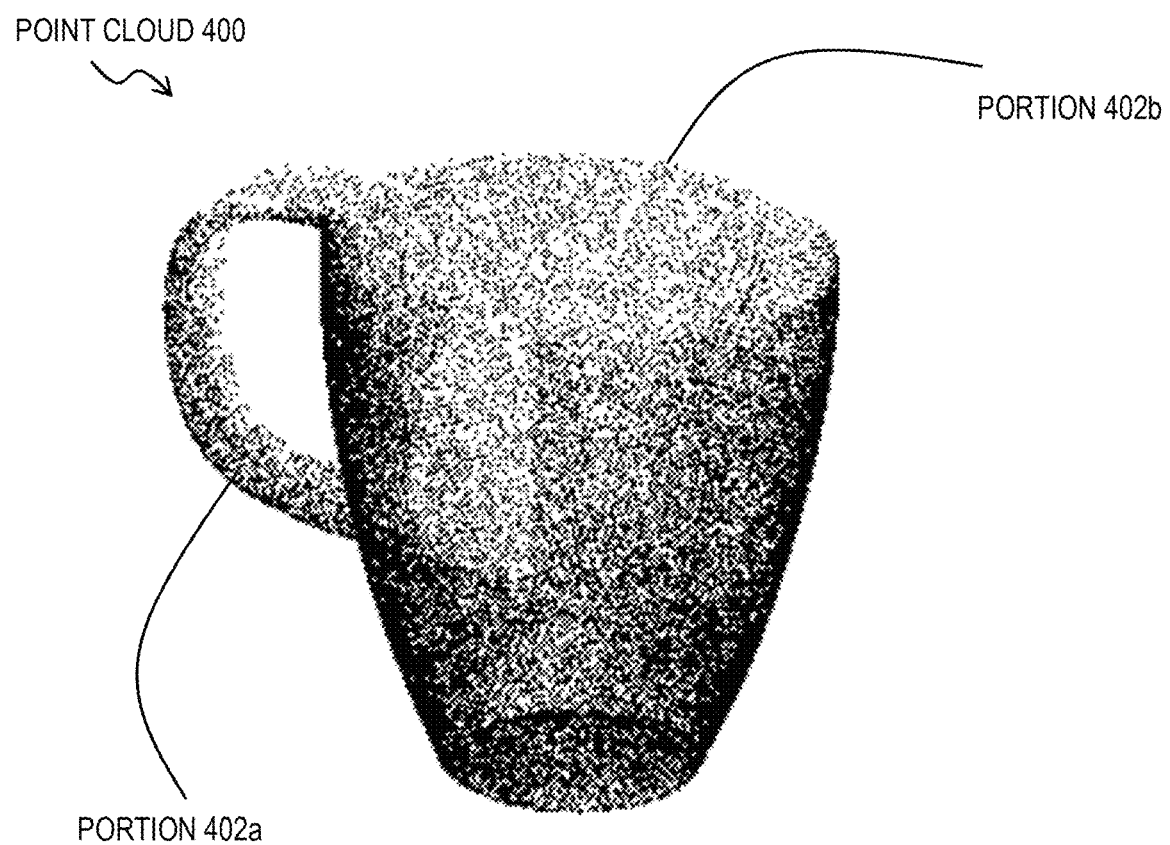

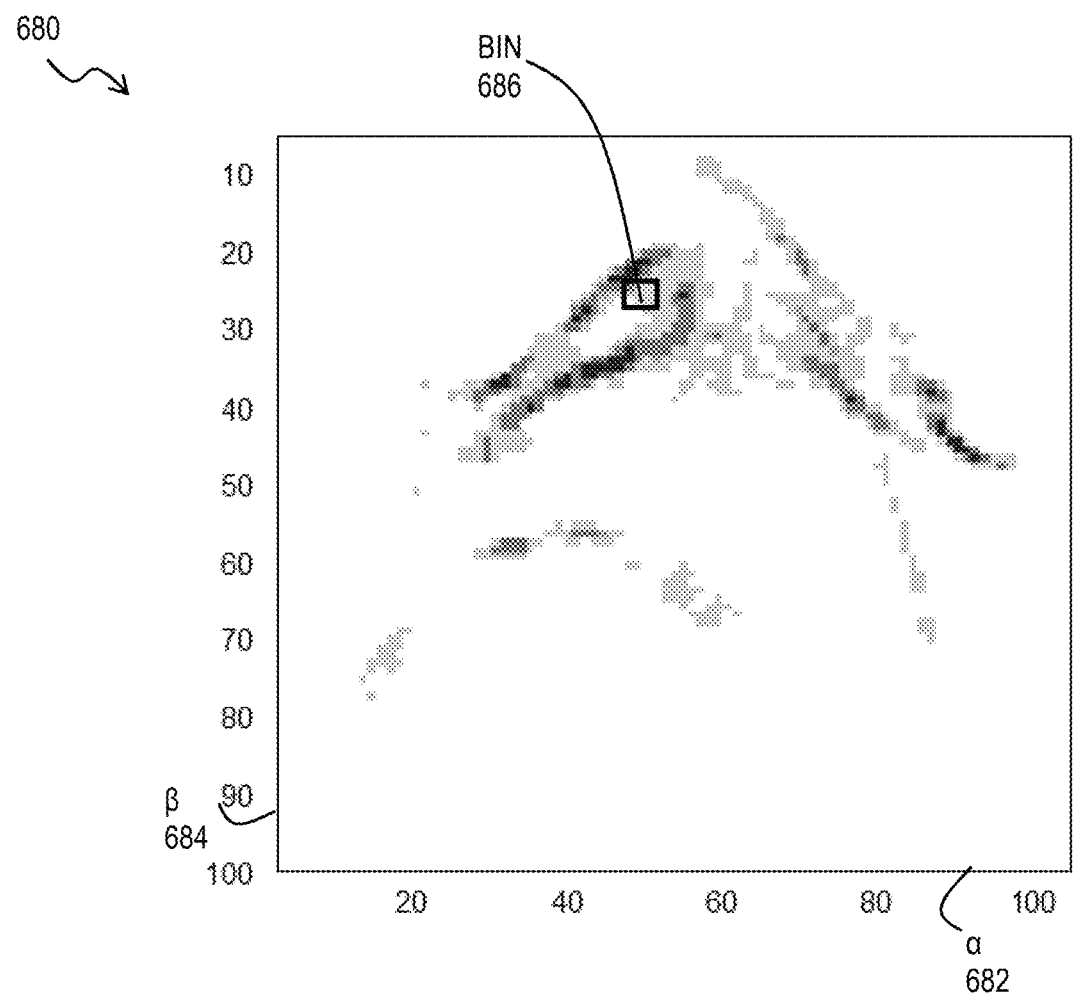

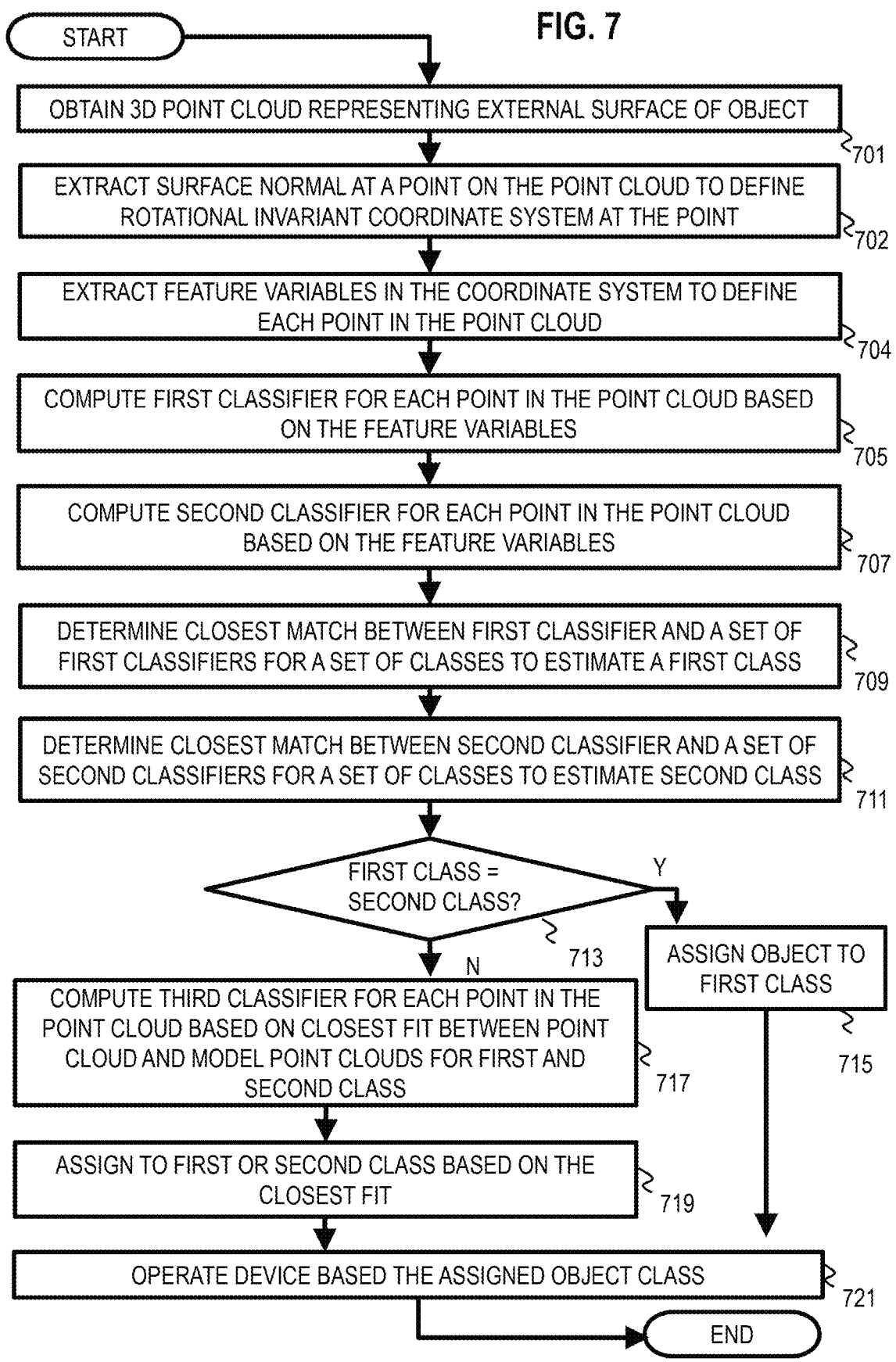

BEST FIT TO 1002a

BEST FIT TO 1002b

METHOD AND SYSTEM FOR CLASSIFICATION OF AN OBJECT IN A POINT CLOUD DATA SET

CROSS-REFERENCE TO RELATED APPLICATIONS

The present application is a continuation of U.S. patent application Ser. No. 16/464,063, filed May 24, 2019, which is a national stage application of International Application No. PCT/US2017/062721, filed Nov. 21, 2017, which claims the benefit of priority to U.S. Provisional Application No. 62/427,573, filed Nov. 29, 2016. The entire disclosures of U.S. patent application Ser. No. 16/464,063, International Application No. PCT/US2017/062721, and U.S. Provisional Application No. 62/427,573 are incorporated herein by reference.

STATEMENT OF GOVERNMENTAL INTEREST

This invention was made with government support under contract N00014-16-C-1026 awarded by the Department of Navy. The government has certain rights in the invention.

BACKGROUND

Optical detection of range, often referenced by a mnemonic, LIDAR, for light detection and ranging, is used for a variety of applications, from altimetry, to imaging, to collision avoidance. LIDAR provides finer scale range resolution with smaller beam sizes than conventional microwave ranging systems, such as radio-wave detection and ranging (RADAR). Optical detection of range can be accomplished with several different techniques, including direct ranging based on round trip travel time of an optical pulse to a target, and chirped detection based on a frequency difference between a transmitted chirped optical signal and a returned signal scattered from a target, and phase encoded detection based on a sequence of single frequency phase changes that are distinguishable from natural signals.

To achieve acceptable range accuracy and detection sensitivity, direct long range LIDAR systems use short pulse lasers with low pulse repetition rate and extremely high pulse peak power. The high pulse power can lead to rapid degradation of optical components. Chirped LIDAR systems use long optical pulses with relatively low peak optical power. In this configuration, the range accuracy depends on the chirp bandwidth rather than the pulse duration, and therefore excellent range accuracy can still be obtained.

Useful optical chirp bandwidths have been achieved using wideband radio frequency (RF) electrical signals to modulate an optical carrier. Recent advances in chirped LIDAR include using the same modulated optical carrier as a reference signal that is combined with the returned signal at an optical detector to produce in the resulting electrical signal a relatively low beat frequency that is proportional to the difference in frequencies between the references and returned optical signals. This kind of beat frequency detection of frequency differences at a detector is called heterodyne detection. It has several advantages known in the art, such as the advantage of using RF components of ready and inexpensive availability. Recent work described in U.S. Pat. No. 7,742,152, shows a novel simpler arrangement of optical components that uses, as the reference optical signal, an optical signal split from the transmitted optical signal. This arrangement is called homodyne detection in that patent.

LIDAR detection with phase encoded microwave signals modulated onto an optical carrier have been used as well. This technique relies on correlating a sequence of phases (or phase changes) of a particular frequency in a return signal with that in the transmitted signal. A time delay associated with a peak in correlation is related to range by the speed of light in the medium. Advantages of this technique include the need for fewer components, and the use of mass produced hardware components developed for phase encoded microwave and optical communications.

The data returned by these LIDAR systems is often represented as a point cloud. A point cloud is a set of data points in some coordinate system. In a three dimensional coordinate system, these points are usually defined by X, Y and Z coordinates, and often are intended to represent the external surface of an object. 3D point clouds can be generated by 3D scanners, such as LIDAR systems including chirped LIDAR and phase coded LIDAR, among other types of scanners.

SUMMARY

The current inventors have recognized circumstances and applications in which automatic classification of objects represented by 3D point clouds is challenging in real time, particularly for objects located at long range. Techniques are provided for such automatic classification of objects.

In a first set of embodiments, a method implemented on a processor includes obtaining a 3D point cloud representing an external surface of an object. The method further includes extracting a surface normal at a point on the 3D point cloud to define a translational and rotational invariant coordinate system at the point and extracting values of one or more feature variables in the coordinate system to define one or more points in the 3D point cloud. The method further includes computing a first classification statistic for the one or more points in the 3D point cloud based on values of the one or more feature variables and computing a second classification statistic for the one or more points in the 3D point cloud based on values of the one or more feature variables. The method further includes determining a closest match between the first classification statistic and a first one of a set of N first classification statistics corresponding to a set of N classes of a first classifier to estimate that the object belongs in a first class. The method further includes determining a closest match between the second classification statistic and a second one of a set of second classification statistics corresponding to the set of N classes of a second classifier to estimate that the object belongs in a second class. If the first class does not correspond to the second class, a third classification statistic is computed for the one or more points in the 3D point cloud based on a closest fit between the 3D point cloud and model point clouds for only the first class and second class of a third classifier. The object is assigned to the first class or second class, based on the closest fit of the third classifier within near real time from receiving the 3D point cloud. The method further includes operating a device based on the one class that the object is assigned to.

In some embodiments of the first set, the first classification statistic is a spin image, the second classification statistic is a covariance matrix, and the third classification statistic is an iterative closest point (ICP).

In a second set of embodiments, an apparatus includes a laser source configured to provide an optical signal. The apparatus includes a splitter configured to receive the signal and produce a transmitted signal and a reference signal. The apparatus also includes an optical coupler configured to direct the transmitted signal outside the apparatus and to receive any return signal backscattered from any object illuminated by the transmitted signal. The apparatus also includes an optical detector disposed to receive the reference signal and the return signal. In addition, the apparatus still further includes a processor configured to perform the steps of receiving an electrical signal from the optical detector. The processor is further configured to perform one or more steps of the above method.

In other embodiments, a system or apparatus or computer-readable medium is configured to perform one or more steps of the above methods.

Still other aspects, features, and advantages are readily apparent from the following detailed description, simply by illustrating a number of particular embodiments and implementations, including the best mode contemplated for carrying out the invention. Other embodiments are also capable of other and different features and advantages, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

Embodiments are illustrated by way of example, and not by way of limitation, in the figures of the accompanying drawings in which like reference numerals refer to similar elements and in which:

FIG. 2 is a block diagram that illustrates example components of a high resolution LIDAR system, according to an embodiment;

FIG. 4 illustrates an example of a 3D point cloud of an object, according to an embodiment;

FIG. 6D is a spin image that illustrates an example of a histogram of the number of points of the 3D point cloud over a range of the feature variables of FIG. 6C, according to an embodiment;

FIG. 7 is a flow chart that illustrates an example method for classifying an object defined by a 3D point cloud, according to an embodiment;

DETAILED DESCRIPTION

Figure 1A:
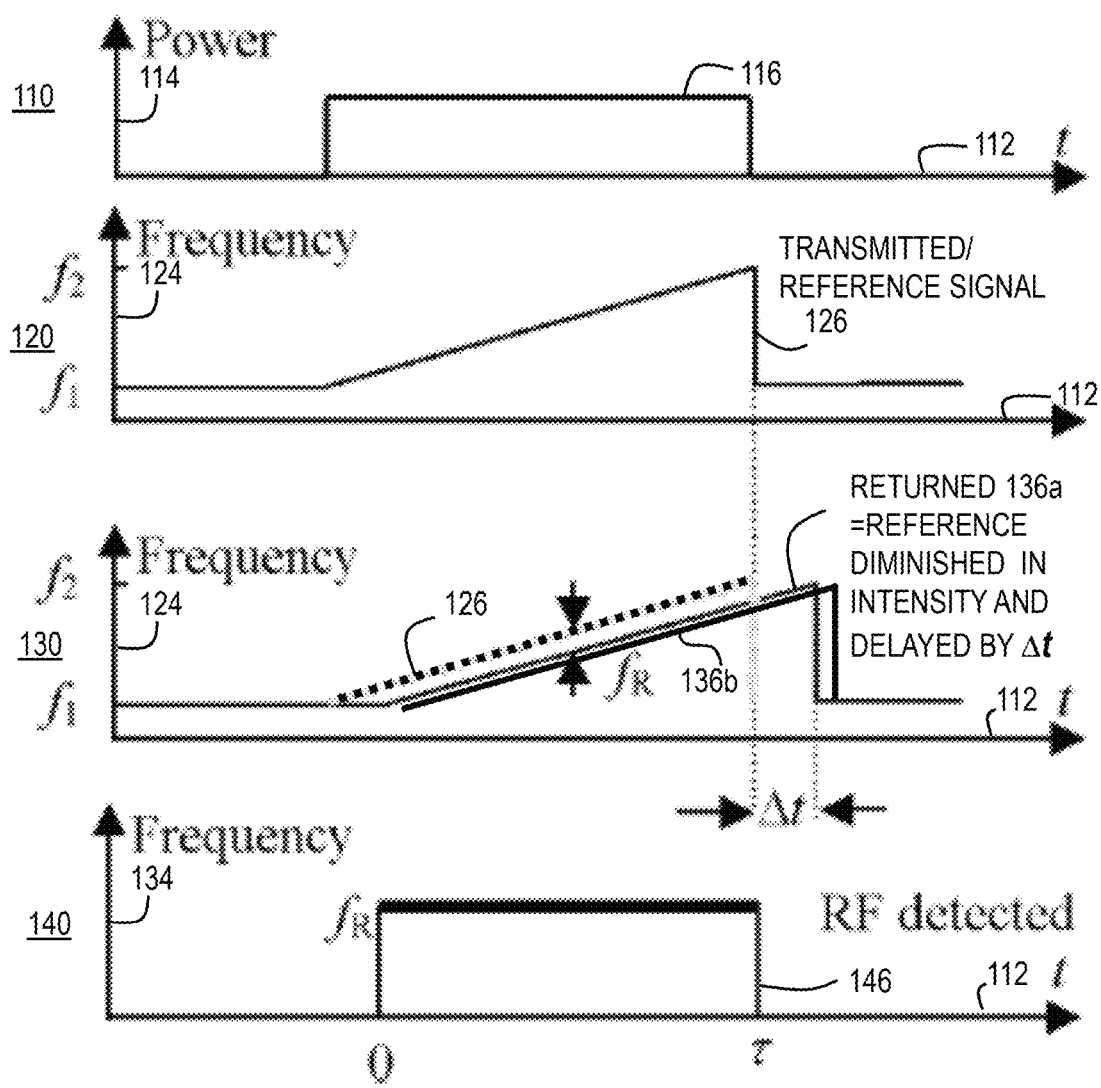
FIG. 1A is a set of graphs that illustrates an example optical chirp measurement of range, according to an embodiment.

A method and apparatus and system and computer-readable medium are described for classifying an object in a 3D point cloud. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements at the time of this writing. Furthermore, unless otherwise clear from the context, a numerical value presented herein has an implied precision given by the least significant digit. Thus a value 1.1 implies a value from 1.05 to 1.15. The term "about" is used to indicate a broader range centered on the given value, and unless otherwise clear from the context implies a broader range around the least significant digit, such as "about 1.1" implies a range from 1.0 to 1.2. If the least significant digit is unclear, then the term "about" implies a factor of two, e.g., "about X" implies a value in the range from 0.5× to 2×, for example, about 100 implies a value in a range from 50 to 200. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

Some embodiments of the invention are described below in the context of classifying objects in 3D point clouds generated by a LIDAR system with a linear frequency modulated optical signal. However, such 3D point clouds need not be generated with LIDAR systems featuring linear chirps and can instead be generated by LIDAR systems where the transmitted signal is modulated in amplitude, frequency or phase or some combination. Embodiments are described in the context of classifying an object within 3D point clouds generated by a system including a single optical beam and its return on a single detector or pair of detectors, which can then be scanned using any known scanning means, such as linear stepping or rotating optical components or with arrays of transmitters and detectors or pairs of detectors. Other embodiments involve classifying objects in 3D point clouds that are not generated by any specific system but are instead generated by a system that is different from the illustrated embodiments. In still other embodiments, the 3D point clouds could be generated with other sensors including any type of 3D scanning LIDAR system (e.g. Velodyne®, Riegl®, Leica®, Faro®) or any "flash" LIDAR system such as those employing LIDAR or Geiger-mode Avalanche Photodiode (APD) array for depth-imaging. These systems possess sufficient down-range and cross-range resolution to collect reasonable data for generating 3D point clouds for use with the embodiments discussed herein.

1. CHIRPED DETECTION OVERVIEW

FIG. 1A is a set of graphs 110, 120, 130, 140 that illustrates an example optical chirp measurement of range, according to an embodiment. The horizontal axis 112 is the same for all four graphs and indicates time in arbitrary units, on the order of milliseconds (ms, 1 ms=$10^{-3}$ seconds). Graph 110 indicates the power of a beam of light used as a transmitted optical signal. The vertical axis 114 in graph 110 indicates power of the transmitted signal in arbitrary units. Trace 116 indicates that the power is on for a limited pulse duration, τ starting at time 0. Graph 120 indicates the frequency of the transmitted signal. The vertical axis 124 indicates the frequency transmitted in arbitrary units. The trace 126 indicates that the frequency of the pulse increases from $f_1$ to $f_2$ over the duration τ of the pulse, and thus has a bandwidth B=$f_2$-$f_1$. The frequency rate of change is ($f_2$-$f_1$)/τ

The returned signal is depicted in graph 130 which has a horizontal axis 112 that indicates time and a vertical axis 124 that indicates frequency as in graph 120. The chirp 126 of graph 120 is also plotted as a dotted line on graph 130. A first returned signal is given by trace 136a, which is just the transmitted reference signal diminished in intensity (not shown) and delayed by Δt. When the returned signal is received from an external object after covering a distance of 2R, where R is the range to the target, the returned signal start at the delayed time Δt is given by 2R/c, were c is the speed of light in the medium (approximately 3×$10^8$ meters per second, m/s). Over this time, the frequency has changed by an amount that depends on the range, called $f_R$, and given by the frequency rate of change multiplied by the delay time. This is given by Equation 1a.

$$f_R=(f_2-f_1)/\tau * 2R/c=2BR/c\ \tau \tag{1a}$$

The value of $f_R$ is measured by the frequency difference between the transmitted signal 126 and returned signal 136a in a time domain mixing operation referred to as de-chirping. So the range R is given by Equation 1b.

$$R=f_R\ c\ \tau/2B \tag{1b}$$

Of course, if the returned signal arrives after the pulse is completely transmitted, that is, if 2R/c is greater than τ, then Equations 1a and 1b are not valid. In this case, the reference signal is delayed a known or fixed amount to ensure the returned signal overlaps the reference signal. The fixed or known delay time of the reference signal is multiplied by the speed of light, c, to give an additional range that is added to range computed from Equation 1b. While the absolute range may be off due to uncertainty of the speed of light in the medium, this is a near-constant error and the relative ranges based on the frequency difference are still very precise.

In some circumstances, a spot illuminated by the transmitted light beam encounters two or more different scatterers at different ranges, such a front and a back of a semi-transparent object, or the closer and farther portions of an object at varying distances from the LIDAR, or two separate objects within the illuminated spot. In such circumstances, a second diminished intensity and differently delayed signal will also be received, indicated in graph 130 by trace 136b. This will have a different measured value of $f_R$ that gives a different range using Equation 1b. In some circumstances, multiple returned signals are received. In some circumstances, the transmitted beam encounters multiple portions of an object and multiple returned signals received from the multiple portions of the object are used to determine a respective range to each of the multiple portions of the object. In these circumstances, the respective range to each of the multiple portions of the object is used to generate a point cloud of the object. Some embodiments of the present invention are provided to classify the object according to the generated point cloud.

Graph 140 depicts the difference frequency $f_R$ between a first returned signal 136a and the reference chirp 126. The horizontal axis 112 indicates time as in all the other aligned graphs in FIG. 1A, and the vertical axis 134 indicates frequency difference on a much expanded scale. Trace 146 depicts the constant frequency $f_R$ measured during the transmitted chirp, which indicates a particular range as given by Equation 1b. The second returned signal 136b, if present, would give rise to a different, larger value of $f_R$ (not shown) during de-chirping; and, as a consequence yield a larger range using Equation 1b.

A common method for de-chirping is to direct both the reference optical signal and the returned optical signal to the same optical detector. The electrical output of the detector is dominated by a beat frequency that is equal to, or otherwise depends on, the difference in the frequencies and phases of the two signals converging on the detector. A Fourier transform of this electrical output signal will yield a peak at the beat frequency. This beat frequency is in the radio frequency (RF) range of Megahertz (MHz, 1 MHz=$10^6$ Hertz=$10^6$ cycles per second) rather than in the optical frequency range of Terahertz (THz, 1 THz=$10^{12}$ Hertz). Such signals are readily processed by common and inexpensive RF components, such as a Fast Fourier Transform (FFT) algorithm running on a microprocessor or a specially built FFT or other digital signal processing (DSP) integrated circuit. In other embodiments, the return signal is mixed with a continuous wave (CW) tone acting as the local oscillator (versus a chirp as the local oscillator). This leads to the detected signal which itself is a chirp (or whatever waveform was transmitted). In this case the detected signal would undergo matched filtering in the digital domain as described in Kachelmyer 1990. The disadvantage is that the digitizer bandwidth requirement is generally higher. The positive aspects of coherent detection are otherwise retained.

Figure 1B:
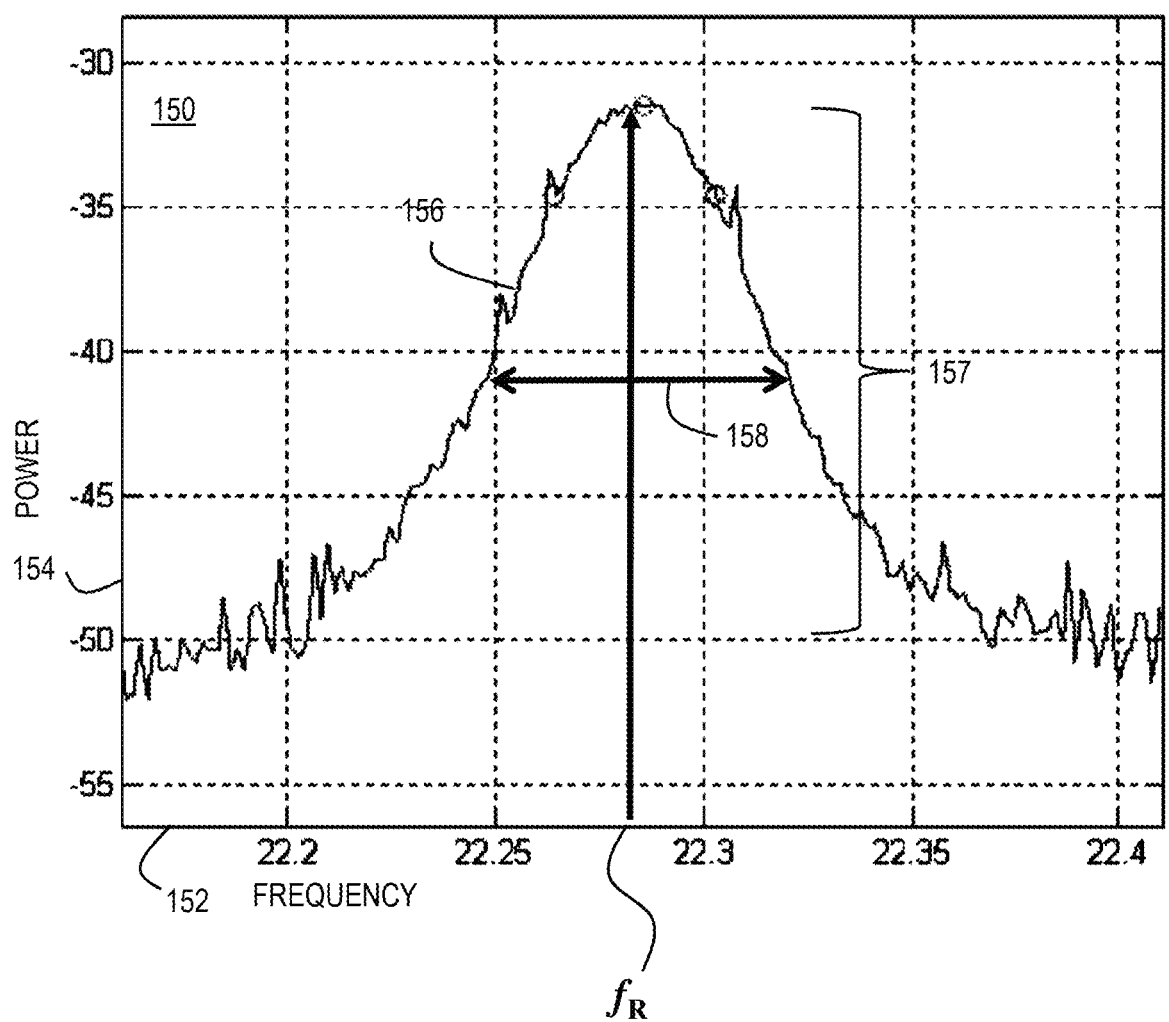
FIG. 1B is a graph that illustrates an example measurement of a beat frequency resulting from de-chirping, which indicates range, according to an embodiment.

FIG. 1B is a graph that illustrates an example measurement of a beat frequency resulting from de-chirping, which indicates range, according to an embodiment. The horizontal axis 152 indicates frequency in Megahertz; and the vertical axis indicates returned signal power density $I_R$ relative to transmitted power density $I_T$ in decibels (dB, Power in dB=20 log($I_R/I_T$)). Trace 156 is the Fourier transform of the electrical signal output by the optical detector, such as produced by a FFT circuit and is based on data published by Adany et al., 2009. The horizontal location of the peak gives $f_R$ that indicates the range, using Equation 1b. In addition, other characteristics of the peak can be used to describe the returned signal. For example, the power value at the peak is characterized by the maximum value of trace 156, or, more usually, by the difference 157 (about 19 dB in FIG. 1B) between the peak value (about −31 dB in FIG. 1B) and a noise floor (about −50 dB in FIG. 1B) at the shoulders of the peak; and, the width of the peak is characterized by the frequency width 158 (about 0.08 MHz in FIG. 1B) at half maximum (FWHM). If there are multiple discernable returns, there will be multiple peaks in the FFT of the electrical output of the optical detector, likely with multiple different power levels and widths. Any method may be used to automatically identify peaks in traces, and characterize those peaks by location, height and width. For example, in some embodiments, FFTW or Peak detection by MATLAB—Signal Processing Toolbox is used, available from MATLAB™ of MATHWORKS™ of Natick, Massachusetts. One can also use custom implementations that rely on FFTW in CUDA and custom peak detection in CUDA™ available from NVIDIA™ of Santa Clara, California. Custom implementation have been programmed on field programmable gate arrays (FPGAs). Commonly used algorithm is to threshold the range profile and run a center of mass algorithm, peak fitting algorithm (3-point Gaussian fit), or nonlinear fit of the peak for some function (such as a Gaussian) to determine the location of the peak more precisely. A moving object can introduce a Doppler frequency shift that causes an offset in the computed range. In some embodiments, Doppler compensation is used. Any known Doppler compensation method and hardware may be used.

A new independent measurement is made at a different angle, or translated position of a moving LIDAR system, using a different pulse after an interlude of $t_i$, so that the pulse rate (PR) is given by the expression $1/(\tau+t_i)$. A frame is a 2 dimensional image of ranges in which each pixel of the image indicates a range to a different portion of an object viewed by the transmitted beam. For a frame assembled from transmitted signals at each of 1000 horizontal vertical angles by 1000 vertical angles, the frame includes $10^6$ pixels and the frame rate (FR) is $10^{-6}$ of the pulse rate, e.g., is $10^{-6}/(\tau+ti)$.

2. RANGE DETECTION HARDWARE OVERVIEW

In order to depict how the range detection approach is implemented, some generic and specific hardware approaches are described. FIG. 2 is a block diagram that illustrates example components of a high resolution LIDAR system, according to an embodiment. A laser source 212 emits a carrier wave 201 that is amplitude or frequency or phase modulated, or some combination, in the modulator 214 to produce a pulse that has a bandwidth B and a duration τ. A splitter 216 splits the chirp into a transmitted beam 205 with most of the energy of the beam 203 and a reference beam 207 with a much smaller amount of energy that is nonetheless enough to produce good heterodyne or homodyne interference with the returned light 291 scattered from a target (not shown). In some embodiments, the transmitted beam is scanned over multiple angles to profile any object in its path. The reference beam is delayed in a reference path 220 sufficiently to arrive at the detector array 230 with the scattered light. In some embodiments, the splitter 216 is upstream of the modulator 214, and the reference beam 207 is unmodulated. In various embodiments, from less to more flexible approaches, the reference is caused to arrive with the scattered or reflected field by: 1) putting a mirror in the scene to reflect a portion of the transmit beam back at the detector array so that path lengths are well matched; 2) using a fiber delay to closely match the path length and broadcast the reference beam with optics near the detector array, as suggested in FIG. 2, with or without a path length adjustment to compensate for the phase difference observed or expected for a particular range; or, 3) using a frequency shifting device (acousto-optic modulator) or time delay of a local oscillator waveform modulation to produce a separate modulation to compensate for path length mismatch; or some combination. In some embodiments, the target is close enough and the pulse duration long enough that the returns sufficiently overlap the reference signal without a delay. In various embodiments, multiple portions of the target scatter a respective returned light 291 signal back to the detector array 230 for each scanned beam resulting in a point cloud based on the multiple ranges of the respective multiple portions of the target illuminated by multiple beams and multiple returns.

The detector array is a single detector or a 1D or 2D array of detectors arranged in a plane roughly perpendicular to returned beams 291 from the target. The phase or amplitude of the interface pattern, or some combination, is recorded by acquisition system 240 for each detector at multiple times during the pulse duration τ. The number of temporal samples per pulse duration affects the down-range extent. The number is often a practical consideration chosen based on pulse repetition rate and available camera frame rate. The frame rate is the sampling bandwidth, often called "digitizer frequency." Basically, if X number of detector array frames are collected during a pulse with resolution bins of Y range width, then a X*Y range extent can be observed. The acquired data is made available to a processing system 250, such as a computer system described below with reference to FIG. 11, or a chip set described below with reference to FIG. 12. In some embodiments, the acquired data is a point cloud based on the multiple ranges of the respective multiple portions of the target. An object classification statistic module 270 classifies the object illuminated with the beam 205 based on the acquired point cloud, according to the method 700 of FIG. 7. Any known apparatus or system may be used to implement the laser source 212, modulator 214, beam splitter 216, reference path 220, detector array 230, or acquisition system 240. Optical coupling to scan or flood or focus on the target or focus past a pupil plane are not depicted. As used herein, an optical coupler is any component that affects the propagation of light within spatial coordinates to direct light from one component to another component, such as a vacuum, air, glass, crystal, mirror, lens, optical circulator, beam splitter, phase plate, polarizer, and optical fiber, among others, alone or in some combination For example, in some chirp embodiments, the laser used was actively linearized with the modulation applied to the current driving the laser. Experiments were also performed with electro-optic modulators providing the modulation. The system is configured to produce a chirp of bandwidth B and duration z, suitable for the down-range resolution desired, as described in more detail below for various embodiments. For example, in some illustrated embodiments, a value of B about 90 GHz and τ of about 200 milliseconds (ms, 1 ms=$10^{-3}$ seconds) were chosen to work within the confines of the relatively low detector array frame rate in the experiments performed These choices were made to observe a reasonably large range window of about 30 cm, which is often important in shape of an object and identification of the object. This technique will work for chirp bandwidths from 10 MHz to 5 THz. However, for the 3D imaging applications, typical ranges are chirp bandwidths from about 300 MHz to about 20 GHz, chirp durations from about 250 nanoseconds (ns, ns=$10^{-9}$ seconds) to about 1 millisecond (ms, 1 ms=$10^{-3}$ seconds), ranges to targets from about 0 meters to about 20 km, spot sizes at target from about 3 millimeters (mm, 1 mm=$10^{-3}$ meters) to about 1 meter (m), depth resolutions at target from about 7.5 mm to about 0.5 m. In some embodiments, the target has a minimum range, such as 400 meters (m). It is noted that the range window can be made to extend to several kilometers under these conditions and that the Doppler resolution can also be quite high (depending on the duration of the chirp). Although processes, equipment, and data structures are depicted in FIG. 2 as integral blocks in a particular arrangement for purposes of illustration, in other embodiments one or more processes or data structures, or portions thereof, are arranged in a different manner, on the same or different hosts, in one or more databases, or are omitted, or one or more different processes or data structures are included on the same or different hosts. For example splitter 216 and reference path 220 include zero or more optical couplers.

Figure 3A:
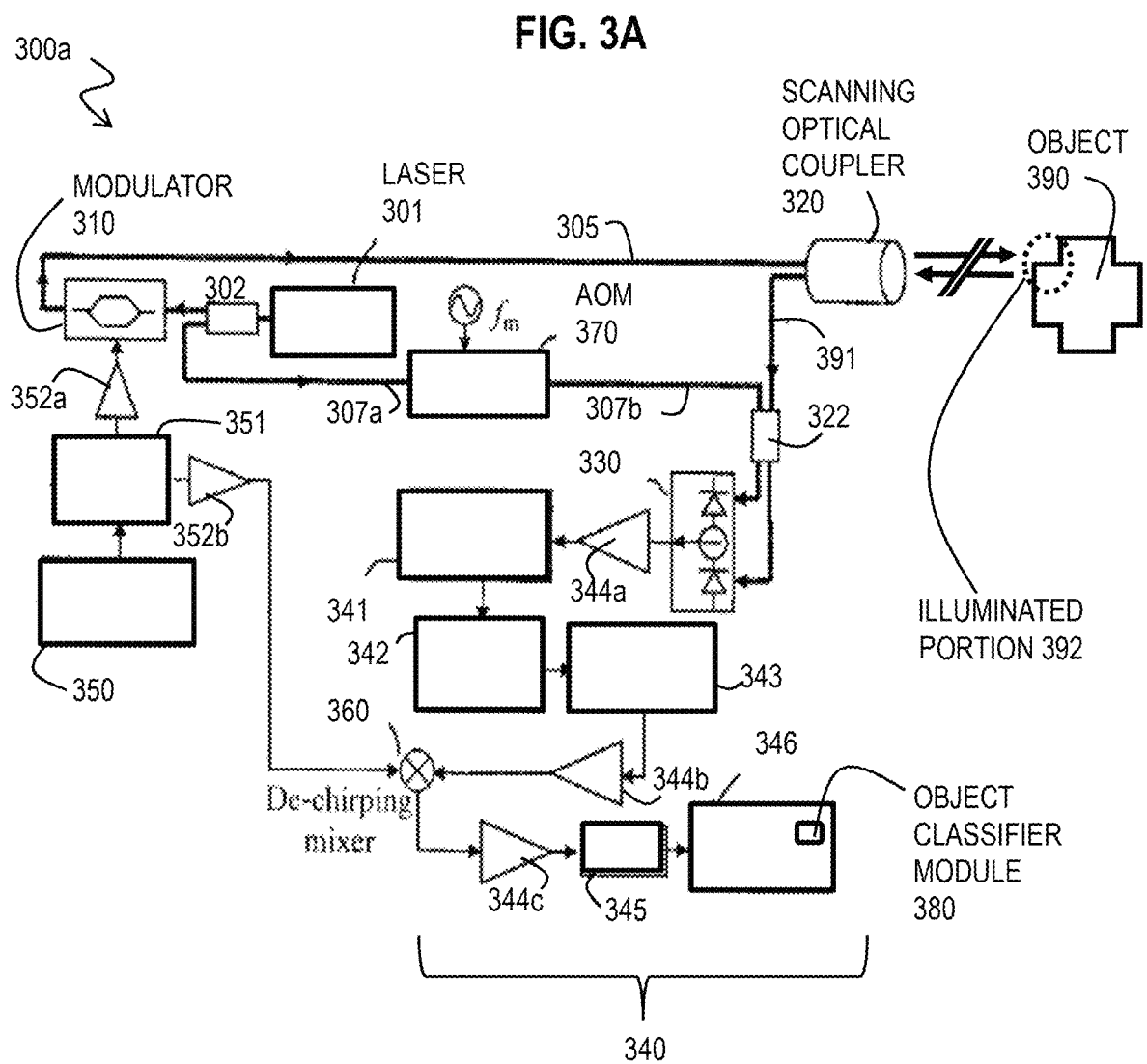
FIG. 3A is a block diagram that illustrates example components of a heterodyne chirped LIDAR system, according to an embodiment.

FIG. 3A is a block diagram that illustrates example components of a heterodyne chirped LIDAR system 300a, according to an embodiment. This system 300a, modified from that described in U.S. Pat. No. 7,742,152, uses electronic de-chirping. Although an object 390 is depicted to illustrate operation of the system 300a, the object 390 is not part of the system 300a. System 300a includes laser 301, modulator 310, telescope as a scanning optical coupler 320, balanced photodetector 330, processing circuitry 340, waveform generator 350 that produces an FM chirp of bandwidth B and duration τ, power splitter 351, de-chirping mixer 360, and acoustic-optic modulator 370. In this system, the source laser 301 output beam is split by beam splitter 302 into two parts; one part is modulated by modulator 310 based on the FM chirp from power splitter 351 and operational amplifier 352a to produce beam 305 that is fed to the telescope.

The other part of the beam, beam 307a is used to generate a local oscillator (LO) for coherent detection. An acoustic speaker produces an acoustic signal with frequency fm to drive an acousto-optic modulator (AOM) 370 to shift the optical frequency by fm in beam 307b, which serves as an intermediate frequency (IF) for heterodyne detection. Optical coupler 322 directs beam 307b onto one of the balanced photodetector 330.

A return optical signal 391 is also directed by optical coupler 322 to the other part of the balanced photodetector. The balanced photodiode 330 rejects the direct detection component. The output electrical signal is amplified in operational amplifier 344a and the IF signal is selected by a bandpass filter 341 and detected by a Schottky diode 342 which recovers the baseband waveform. The resulting electrical signal is directed through low pass filter 343 and operational amplifier 344b.

A de-chirping mixer 360 compares this detected signal with the original chirp waveform output by power splitter 351 and operational amplifier 352b to produce an electrical signal with the beat frequency that depends on the frequency difference between the RF reference waveform and the detected waveform. Another operational amplifier 344c and a FFT process 345 is used to find the beating frequency. Processor 346 is programmed to do data analysis. Coherent detection systems like 300a significantly improve receiver signal to noise ratio (SNR) compared to direct detection of pulse travel time, however, at the cost of greatly increased system complexity. The electrical components from operational amplifier 344a and de-chirping mixer 360 through processor 346 constitute a signal processing component 340.

According to the illustrated embodiment, the light beam emitted from optical coupler 320 impinges on one or more objects 390 with a finite beam size that illuminates an illuminated portion 392 of the one or more objects. Backscattered light from an illuminated portion is returned through the telescope to be directed by optical coupler 322 onto the optical detector, such as one photodiode of a balanced photodetector 330. In some embodiments, the light beam emitted from optical coupler 320 impinges on multiple portions 392 of an object and backscattered light 391 is returned from each of the multiple portions 392 of the object to determine the respective range to each multiple portion of the object. In these embodiments, the respective range of each multiple portion of the object is used to add a point to a point cloud of one or more objects. After many measurements at different angles or different positions of the LIDAR system, a point cloud emerges. The processor 346 includes an object classification statistic module 380, as described below, to classify the object 390 illuminated with the beam 305 based on the point cloud, according to the method 700 of FIG. 7.

Figure 3B:
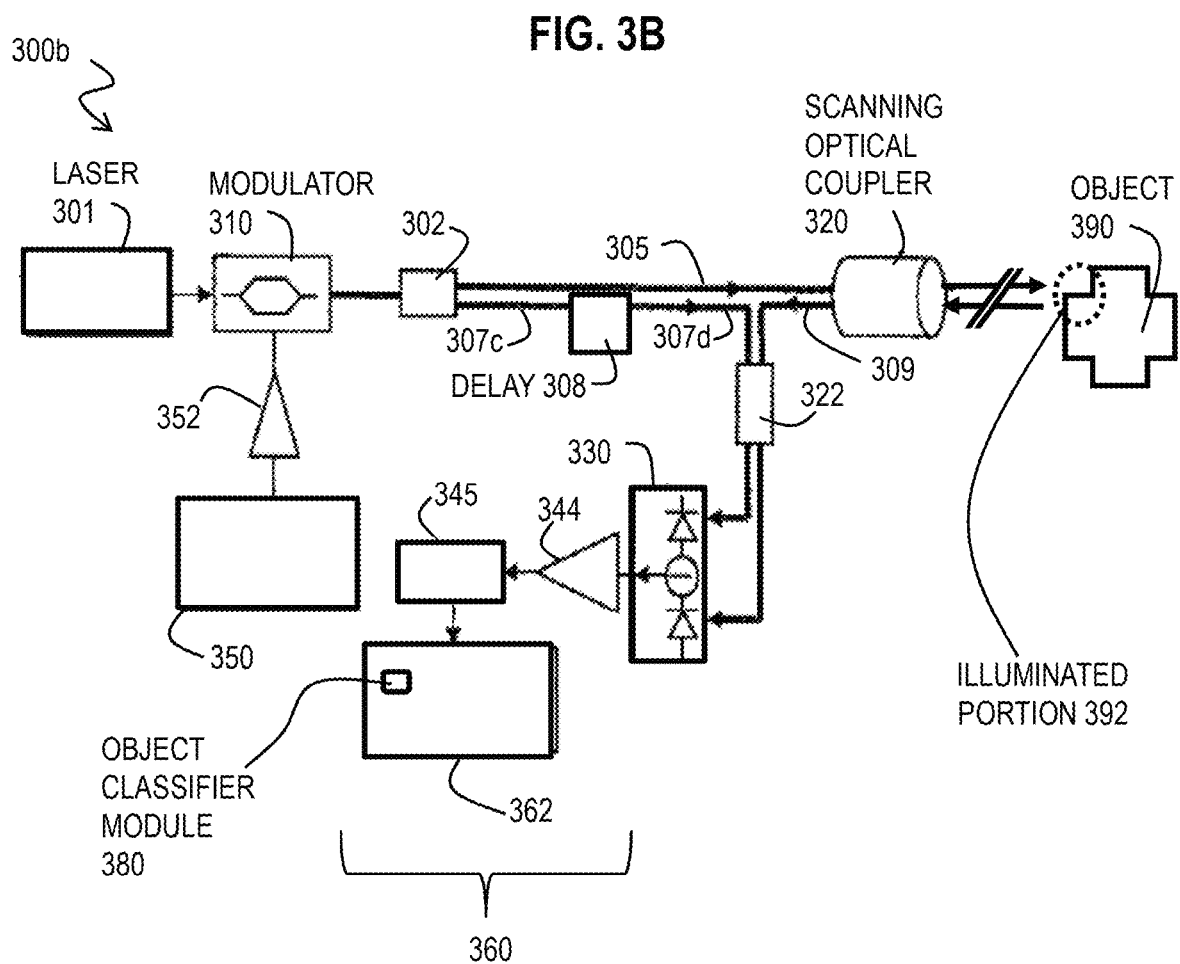
FIG. 3B is a block diagram that illustrates example components of a homodyne chirped LIDAR system, according to an embodiment.

FIG. 3B is a block diagram that illustrates example components of a homodyne chirped LIDAR system 300b, according to an embodiment. This system 300b, modified from that described in U.S. Pat. No. 7,742,152, uses photonic de-chirping and simplifies the RF components. Although an object 390 is depicted to illustrate operation of the system 300b, the object 390 is not part of the system 300b. The system 300b includes waveform generator 350, laser 301, modulator 310, splitter 302 downstream of the modulator 310, telescope used as scanning optical coupler 320, balanced photodetector 330, and processing circuitry 360.

In this system, both the optical signal and the local oscillator LO are driven by the same waveform generator 350 and amplified in operational amplifier 352. The beam output by the modulator 310 is split by beam splitter 302 to a beam part 305 and a beam part 307c. The beam part 305, with most of the beam energy, e.g., 90% or more, is transmitted through the optical coupler 320 to illuminate the illuminated portion 392 of the object 390. In some embodiments, the beam 305 illuminates multiple portions 392 of the object 390. In these embodiments, multiple return signals 309 are directed to the photodetector 330 from each of the multiple portions 392 of the object 390 and the respective range to each of the multiple portions 392 of the object 390 is determined. The beam part 307c is delayed a desired amount in delay 308 to produce the reference signal 307d. In some embodiments, there is no delay and delay 308 is omitted. The reference signal 307d and the return signal 309 from the telescope or other optical coupler 320 are directed to the photodetector 330 by optical couplers 322.

The de-chirping process is accomplished within the balanced photodiode 330 and therefore eliminates the need of de-chirping mixing and the associated RF processing. Because the original chirp optical waveform, which is carried by the LO, beats with its delayed version at the photodiode as indicated, target distance can be directly obtained by a frequency analysis in an FFT component 345 of the photocurrent signal output by operational amplifier 344. The detected target distance, which is the range to the illuminated portion, for each return is added as a point to the point cloud of the one or more objects. In some embodiments, each portion of the target has a minimum range, such as 400 meters (m). Processor 362 is programmed to do data analysis. The processor 362 includes an object classification statistic module 380, as described below, to classify the object illuminated with the beam 305 based on a point cloud, according to the method 700 of FIG. 7. The electrical components from operational amplifier 344 through processor 362 constitute a signal processing component 360. Considering that shot noise is the dominant noise with coherent detection, SNR at the beating frequency is reduced compared to SNR of direct detection and SNR of the system 300a.

3. K-D TREE OVERVIEW

Figure 5A:
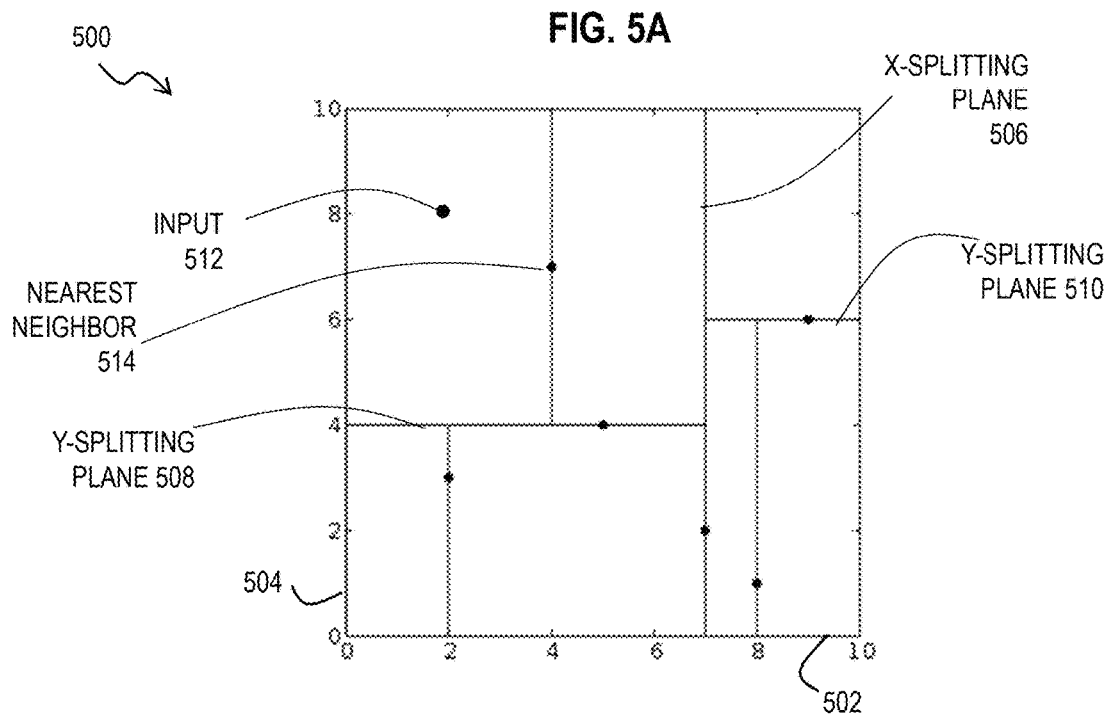
FIG. 5A is a graph that illustrates an example of a k-d tree composition for a point set, according to an embodiment.
Figure 5B:
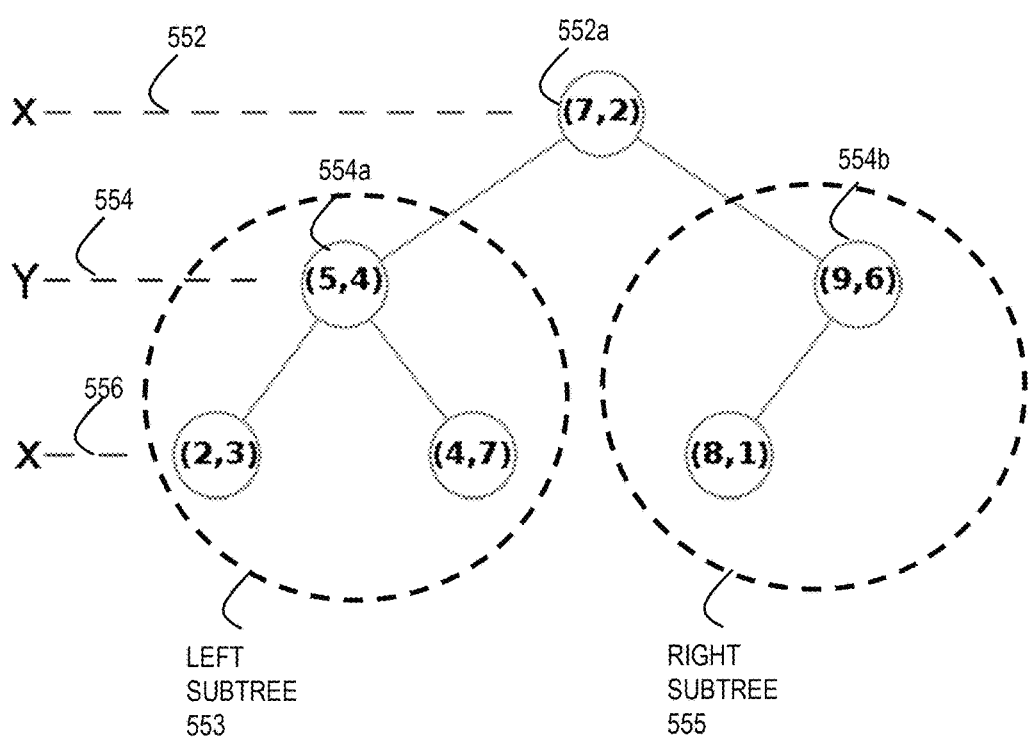
FIG. 5B illustrates an example of a k-d tree based on the k-d tree composition of FIG. 5A, according to an embodiment.

A k-d tree (short for k-dimensional tree) is a space-partitioning data structure for organizing points in a k-dimensional space. K-d trees are a useful data structure for several applications, such as searches involving a multidimensional search key (e.g. range searches and nearest neighbor searches). K-d trees are a special case of binary space partitioning trees. FIG. 5A is a graph that illustrates an example of a k-d tree composition 500 for a point set, according to an embodiment. FIG. 5B illustrates an example of a k-d tree 550 based on the k-d tree composition 500 of FIG. 5A, according to an embodiment. The example embodiments of FIGS. 5A-5B depict a k-d tree where k=2 (e.g. two dimensional x-y space). The k-d tree of FIGS. 5A-5B is based on the point set {(2,3), (5,4), (9,6), (4,7), (8,1), (7,2)}. The graph of FIG. 5A plots each point in the point set. The horizontal axis 502 is the x-axis and the vertical axis 504 is the y-axis.

The k-d tree 550 is a binary tree with a plurality of nodes 552, 554, 556, including a root node 552 and a leaf node 556. Every non-leaf node (e.g. node 552, 554) can be thought of as implicitly generating a splitting hyperplane that divides the space into two parts, known as half-spaces. Points to the left of this hyperplane are represented by the left subtree of that node and points right of the hyperplane are represented by the right subtree. The hyperplane direction is chosen in the following way: every node in the tree is associated with one of the k-dimensions, with the hyperplane perpendicular to that dimension's axis. In the example embodiment of FIG. 5B, root node 552 is associated with the x-dimension and a point 552a is chosen (e.g. (7,2)) from the point set with a median value in the x-dimension. An x-splitting plane 506 is generated in the k-d tree composition 500 based on this median value in the x-dimension (e.g. x=7). Points from the point set to the left of this plane 506 are represented by the left subtree 553 and points from the point set to the right of this plane 506 are represented by the right subtree 555.

Node 554 is associated with the y-dimension. A point 554a is chosen (e.g. (5,4)) from the points to one side (left side) of the x-splitting plane 506 (e.g. points in the left subtree 553) with a median value in the y-dimension. A y-splitting plane 508 is generated in the k-d tree composition 500 based on this median value in the y-dimension (e.g. y=4). A point to the one side (bottom side) of this y-splitting plane 508 is represented in the leaf node 556 by point (2,3) while a point to the other side (top side) of this y-splitting plane 508 is represented in the right leaf node 556 by point (4,7). Similarly, a point 554b is chosen (e.g. (9,6)) from the point set in the right subtree 555 with a median value in the y-dimension and a y-splitting plane 510 is generated in the k-d tree composition based on this median value in the y-dimension (e.g. y=6). A point to the left of this y-splitting plane 510 is represented in the leaf node 556 by point (8,1), while there are no points to the right of this y-splitting plane 510 in the point set.

In some embodiments, the k-d tree 550 can be used to perform a nearest neighbor (NN) search, which aims to find the point in the set that is nearest to a given input point. In an example embodiment, the input point 512 is (2,8). This search can be done efficiently by using the tree properties to quickly eliminate large portions of the search space. In some embodiments, searching for a nearest neighbor in a k-d tree proceeds by starting with the root node 552a. The search moves down the tree 550 recursively, in the same way that it would if the input point were being inserted (i.e. it goes left or right depending on whether the point is lesser than or greater than the current node in the split dimension). At the root node 552a, the input point (2,8) is less than the point (7,2) at node 552a in the split dimension (e.g. x dimension) and thus the search moves to the left subtree 553. At the node 554a, the input point (2,8) is greater than the point (5,4) at node 554a in the split dimension (e.g. y dimension) and thus the search moves to the right and to point (4,7) at the leaf node 556. Once the search reaches a leaf node 556 point, the search saves the node point as the "nearest neighbor". In this example, the search saves (4,7) as the "nearest neighbor" to the input point (2,8). FIG. 5A depicts the input point 512 and nearest neighbor 514 corresponding to (4,7) at the leaf node 556. Software is available that can produce K-d trees for K-dimensional datasets. For example, Accord-framework-.net is an open source software platform that provides k-d tree nearest neighbor search algorithms in C#.

4. POINT CLOUD OVERVIEW

A point cloud is a set of data points in some coordinate system. In a three-dimensional coordinate system, these points are usually defined by X, Y, and Z coordinates, and often are intended to represent the external surface of an object. In other embodiments each point in the point cloud is represented in a different coordinate system, such a polar coordinate system that positions each point using a range and a azimuthal angle and an elevation angle from some convenient origin, such as the location of the LIDAR scanner. Point clouds may be created by 3D scanners. These devices measure a large number of points on an object's surface, and often output a point cloud as a data file. The point cloud represents the set of points that the device has measured. FIG. 4 illustrates an example of a 3D point cloud 400 of an object, such as a cup, according to an embodiment. The 3D scanner measures points at different portions of the cup surface, including a portion 402a corresponding to the cup handle and a portion 402b corresponding to the cup rim, for example. In some embodiments, 3D point clouds of objects are created by optical LIDAR systems, such as the systems 200, 300a, 300b of FIGS. 2 and 3A-3B previously discussed above. In these embodiments, a 3D point cloud of the object (not shown) in FIG. 2 or the object 390 in FIGS. 3A-3B is obtained including a number of points on the object surface, based on the respective range calculated to multiple portions of the object. If the object is opaque to the light of the scanner and the object and scanner are immobile, only one side of the object is observed and the point cloud is said to be occluded. If either the object or the scanner is moved to expose multiple sides of the object to the scanner (e.g., by rotating the object), than a more complete 3D representation of the surface of the object can be obtained.

As the output of 3D scanning processes, point clouds are used for many purposes, including to create 3D CAD models for manufactured parts, metrology/quality inspection, and a multitude of visualization, animation, rendering and mass customization applications. While point clouds can be directly rendered and inspected, usually point clouds themselves are generally not directly usable in most 3D applications, and therefore are usually converted to polygon mesh or triangle mesh models, NURBS surface models, or CAD models through a process commonly referred to as surface reconstruction. There are many techniques for converting a point cloud to a 3D surface. Some approaches, like Delaunay triangulation, alpha shapes, and ball pivoting, build a network of triangles over the existing vertices of the point cloud, while other approaches convert the point cloud into a volumetric distance field and reconstruct the implicit surface so defined through a marching cubes algorithm.

One application in which point clouds are directly usable is industrial metrology or inspection using industrial computed tomography. The point cloud of a manufactured part can be aligned to a CAD model (or even another point cloud), and compared to check for differences. These differences can be displayed as color maps that give a visual indicator of the deviation between the manufactured part and the CAD model. Geometric dimensions and tolerances can also be extracted directly from the point cloud.

5. OBJECT CLASSIFICATION STATISTIC OVERVIEW

Object classification seeks to determine from a point cloud of an otherwise unknown object, the class of objects to which the object giving rise to the point cloud probably belongs. The various methods use a training set of known objects and characterize one or more properties of point clouds for the class. Then a point cloud of the unknown object is used to derive values for those one or more properties. The values of the properties for the unknown object are then matched using some measure of similarity to a class with values most similar those of the unknown object. In the following embodiments, the problem is made tractable by limiting the classes of objects to a discreet number N of classes of interest, e.g., N types of vehicles and roadside structures, or N types of tableware, or N types of animals, or N types of hand-held weapons. The unknown object then is adequately similar to one of the N classes or is rejected as not of interest.

Figure 6A:
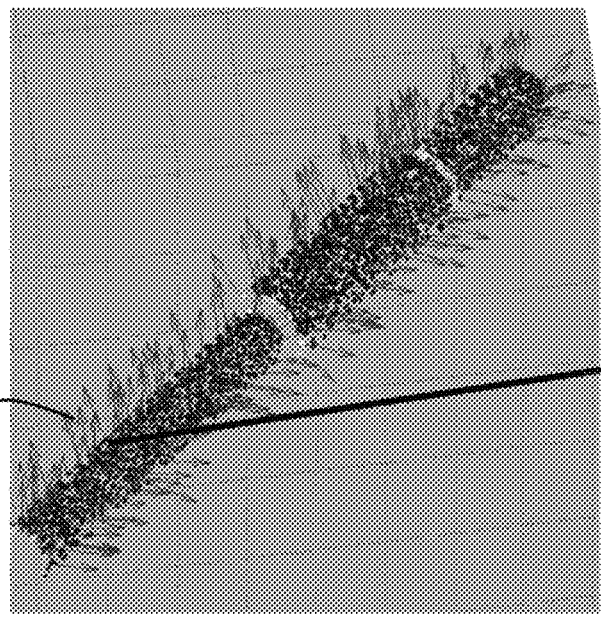
FIG. 6A illustrates an example of a 3D point cloud of an object, according to an embodiment.
Figure 6B:
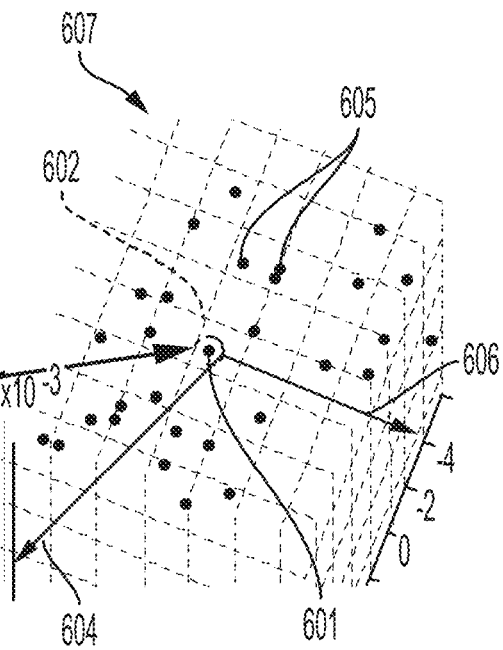
FIG. 6B illustrates a segment of the 3D point cloud of FIG. 6A, according to an embodiment.

FIG. 6A illustrates an example of a 3D point cloud 600 of an object, according to an embodiment. In some embodiments, the 3D point cloud is obtained using an optical LIDAR system, such as described above with reference to FIG. 2 through FIG. 3B. In other embodiments, the 3D point cloud is obtained from a 3D scanner other than such optical systems. FIG. 6B is illustrates a segment 607 of the 3D point cloud 600 of FIG. 6A including a point 601 and nearest neighbor points 605 around the point 601, according to an embodiment.

Surface normals 602 are depicted in FIG. 6A and approximate a normal to the surface of the object at each point of the point cloud. The surface normal 602 at each point on the point cloud 600 is approximated. In some embodiments, the surface normal 602 is approximated using a process disclosed in Klasing 2009. In some embodiments, the surface normal 602 at the point 601 is determined by initially determining the nearest neighbor points 605 around the point 601. FIG. 6B labels some of the points 605 for purposes of simplicity. As discussed in Klasing, the (x, y, z) values of the nearest neighbor points 605 are used to construct a 3×3 covariance matrix C. In one embodiment, a minimum of three points 605 are used to construct the 3×3 covariance matrix C and define a plane in 3D. In other embodiments, the minimum number of points 605 to construct a covariance matrix C should be in a range from about 10 points to about 20 points to practically deal with noise in the system and obtain a useful measurement and still produce results in real-time or near real-time, as defined below. Eigenvalues ($\lambda_1$, $\lambda_2$, $\lambda_3$) and eigenvectors ($e_1$, $e_2$, $e_3$) of the matrix C are then computed. These eigenvalues represent an approximation of the variance of the points 605 in each of the three directions represented by the eigenvectors. In some embodiments, the eigenvector associated with the smallest eigenvalue is used to approximate the surface normal 602 at the point 601, since this eigenvector approximates the direction of minimal variance of the points 605 and the other two eigenvector's define a plane with most of the variance.. In other embodiments, a curvature of the object surface at point 601 can be estimated using the eigenvalues as:

$$\text{Curvature} = \frac{\lambda_3}{\lambda_1 + \lambda_2 + \lambda_3} \quad (2)$$

The surface normal 602 at each point 601 can be approximated using any method beyond that disclosed in Klasing.

Figure 6C:
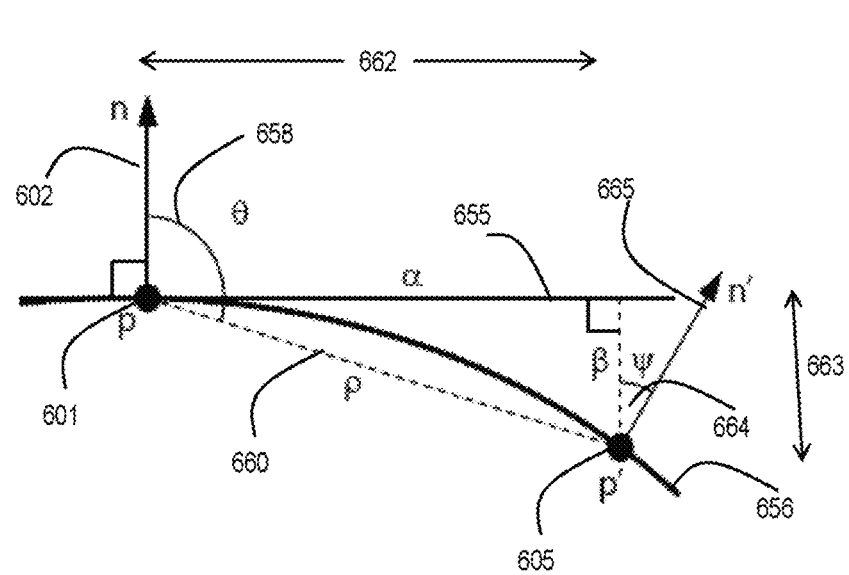
FIG. 6C is a block diagram that illustrates an example of feature variables to define the points of a 3D point cloud within a rotational and translational invariant coordinate system, according to an embodiment.

FIG. 6C is a block diagram 650 that illustrates an example of feature variables defined by the points 605 of a 3D point cloud within a translational and rotational invariant coordinate system, according to an embodiment. The translational and rotational invariant coordinate system is defined by the surface normal 602 at the point 601 and a plane 655 that is orthogonal to the surface normal 602 and tangent to the object surface 656 at the point 601. In some embodiments, a feature variable a is defined by a distance 662 along the plane 655 from the point 601 to the point 605. In other embodiments, a feature variable β is defined by a distance 663 perpendicular to the plane 655 from the point 601 to the point 605; or a feature variable is defined by the pair of distances α, β. In still other embodiments, a feature variable ρ is a straight distance 660 from point 601 to point 605, and is derived with Pythagorean's theorem using α and β. In still other embodiments, a feature variable θ is an angle 658 measured between the surface normal 602 and ρ. In still other embodiments, a feature variable is a surface normal 665 at the point 605 that is determined using similar methods as those used to determine the surface normal 602. In still other embodiments, ψ is an angle 664 measured between the surface normal 665 and β. In other embodiments, other feature variables are defined, such as a length of an arc with continuous smooth tangent angles between 601 and 605. A set of one or more feature variables can be used in various embodiments. Each of one or more points in the 3D point cloud has a set of values corresponding to the one or more feature variables in the feature set.

FIG. 6D is a spin image 680 that illustrates an example of a histogram of the number of points 605 of the 3D point cloud over a range of values for two of the feature variables of FIG. 6C, according to an embodiment. The horizontal axis 682 indicates the value of feature variable α in centimeters (cm). The vertical axis 684 indicates the value of feature variable β in centimeters (cm). The α-β space is divided up into a plurality of bins 686. One bin 686 is depicted in FIG. 6D for purposes of simplicity. In an example embodiment, the bins 686 have a square dimension of 1 centimeter (cm)×1 centimeter (cm). The histogram assigns a value for each bin 686, based on the number of points 605 of the 3D point cloud with values within the α-β range defined by the bin 686. A greyscale is used to indicate the value of each bin 686, where the value of each bin 686 is represented by low values (e.g. white) through high values (e.g. black).

In some embodiments, the spin image 680 is obtained for one segment of a 3D point cloud, such as the segment 607 depicted in FIG. 6B of the point cloud 600 depicted in FIG. 6A. In an example embodiment, the segment has a dimension of approximately 0.5 meters (m). In these embodiments, multiple spin images 680 are obtained over corresponding multiple segments that span the point cloud 600. In some embodiments values of the feature variables (e.g., α, β) are obtained to define each point in each segment of the point cloud 600. In other embodiments values for the feature variables (e.g., α, β) are determined for only one or a few of the point cloud points in each segment. In these embodiments, the spin images 680 are sufficiently similar across the segments that each segment is recognizable as belonging to the same class as the object used to generate the point cloud 600. Spin images 680 are obtained for any points in the point cloud 600 based on methods disclosed in Johnson 1997.

In some embodiments, the spin image 680 for each segment is represented by a vector with a dimension equal to the number of bins 686. In these embodiments, the vector is represented by $[P_1, P_2, P_3, P_4 \ldots P_B]$, where $P_n$ represents the number of points 605 in the $n^{th}$ bin 686 and where B is the total number of bins 686. In an example embodiment, where the α-β range of the spin image 680 is 40 centimeters (cm) by 40 centimeters (cm) and where the bin 686 has a dimension of 1 cm×1 cm, B is 1600, resulting in a 1600 dimensional vector. In some embodiments, the histogram of the spin image 680 is smoothed using a discrete Parzen window approach before the spin image 680 is represented by the vector. In other embodiments, the vector represented by the spin image 680 is normalized, to remove variability that may arise due to changes in point density.

In some embodiments, the object that generated the spin image 680 is classified in about real-time or near real-time based on a fixed number (N) of classes. For purposes of this description, real-time is based on a frame rate of the 3D scanner (e.g. LIDAR) used to capture the 3D point cloud that generates the spin image 680. An inverse of the frame rate is a time capture period during which the 3D scanner captures the 3D point cloud. In one embodiment, real-time is defined as a period within the time capture period. In one example embodiment, the frame rate is in a range from 2.5-10 frames per second, corresponding to a time capture period of 0.1-0.25 seconds (sec). This kind of time period is advantageous for identifying objects in tactical and collision avoidance applications. . Near real-time is within a factor of about ten of real-time, e.g., within about 2.5 seconds for the above example time capture periods.

Point cloud data was collected for objects in each class across a variety of perspectives and orientations. Values of the (α, β) feature variables were extracted from the point clouds for the objects in each class. Since the class membership of each point cloud is known (e.g. a box, a traffic cone, etc), the values of the feature variables were labeled with the known class. The set of labeled spin images were trained using standard linear discriminant analysis (LDA), as disclosed in Ye 2007.

In an embodiment, a dimensionality reduction step is performed on the spin image 680 vector. In one embodiment, the dimension of the spin image 680 vector is reduced from the total number of bins 686 to a reduced dimension based on a total number of classes (N). In an example embodiment, the dimension of the spin image 680 vector is reduced from the total number, 1600, of bins 686 to N−1. In some embodiments, a predetermined set of projection vectors acquired during the training of the labeled spin images in LDA are used to project a dimension of the spin image 680 vector from the total number, 1600, of bins 686 to N−1. In some embodiments, the predetermined set of projection vectors are associated with a respective set of spin images for the N classes. As disclosed in Ye 2007, in this manageable feature space, a k-d tree and NN (nearest neighbor) search is performed in order to assign class membership to any unknown object with a 3D point cloud used to generate the new spin image 680. In some embodiments, where multiple spin images 680 are obtained over the multiple segments 607 that span the point cloud 600 of the unknown object, each spin image 680 is projected to the reduced dimension (e.g. N−1) and the NN search is performed to assign class membership to each segment spin image 680. In some embodiments, the projection of the spin image 680 to the reduced dimension space and the NN search assigning class membership to the spin image 680 are performed in about real-time or near real-time. In an example embodiment, if a substantial number (e.g. 90%) of the segment spin images 680 of the point cloud 600 are assigned the same class, then the unknown object used to generate the point cloud 600 is assigned that same class. In other embodiments, learning techniques are used to identify one or more sub-sets of all spin images 680 encompassing a 3D point cloud as respective subclasses with less internal variance. In other embodiments, the dimensionality reduction step is performed on the spin image 680 vector using principal component analysis in addition to or instead of the LDA.

In some embodiments, the values of feature variables [α, β, θ, ρ, ψ] are determined for each point 605 in the point cloud 600. These feature variables are then assembled in a data matrix F:

$$F = \begin{matrix} \alpha_1 & \ldots & \alpha_M \\ \beta_1 & \ldots & \beta_M \\ \ldots & \ldots & \ldots \end{matrix} \quad (3)$$

where F is an n×M matrix, n is the number of feature variables and M is the number of points 605 in the point cloud. In the illustrated embodiment, n=5 refers to feature variables [α, β, θ, ρ, ψ]. However, n is not limited to any specific number and may be less than 5 or more than 5 or may include different feature variables than those listed above.

A mean of each feature variable [α, β, θ, ρ, ψ] over the number of M points 605 in each row of the matrix is then determined. A zero-mean data matrix $\tilde{F}$ is assembled, by subtracting the mean of each feature variable (e.g. $\bar{\alpha}, \bar{\beta}, \bar{\theta},$ $\bar{\rho}, \bar{\psi}$) from a respective row of the data matrix F associated with the feature variable. The resulting zero-mean data matrix $\tilde{F}$ is provided by:

$$\tilde{F} = \begin{matrix} \alpha_1 - \bar{\alpha} & \dots & \alpha_M - \bar{\alpha} \\ \beta_1 - \bar{\beta} & \dots & \beta_M - \bar{\beta} \\ \dots & \dots & \dots \end{matrix} \quad (4)$$

The zero-mean data matrix $\tilde{F}$ is also an n×M matrix, as with the data matrix F. A covariance matrix C is then assembled, based on the zero-mean data matrix $\tilde{F}$ as:

$$C = \frac{1}{N}(\tilde{F}\tilde{F}') = \begin{matrix} \sigma_1^2 & \dots & \sigma_1\sigma_n \\ \dots & \dots & \dots \\ \sigma_1\sigma_n & \dots & \sigma_n^2 \end{matrix} \quad (5)$$

where $\sigma_n$ is a variance of the $n^{th}$ feature variable from the feature variable mean over the M number of elements in the row representing the points 605 in the point cloud segment 607. The diagonal elements of the covariance matrix C represent the variance (e.g. $\sigma_1^2$) of a single feature variable, whereas non-diagonal elements of the covariance matrix C represent the co-variance (e.g. $\sigma_1 \sigma_2$) of two different feature variables. The covariance matrix C is an n×n matrix, since the zero-mean data matrix $\tilde{F}$ is an n x M matrix and matrix $\tilde{F}^{-1}$ is an M×n matrix. In the illustrated embodiment, where each of the above five feature variables is used to assemble the covariance matrix C, the covariance matrix is a 5×5 matrix. However, the covariance matrix C can be any sized n×n matrix, where n is less then or more than 5, depending on the number of feature variables that are used for classification purposes. In some embodiments, the covariance matrix C is constructed using the feature variables for each point, based on methods disclosed in Fehr 2012.

In some embodiments, the object that generated the point cloud used to assemble the covariance matrix C is classified about in real-time or near-real time, as defined above, based on the fixed number (N) of classes.

Figure 6E:
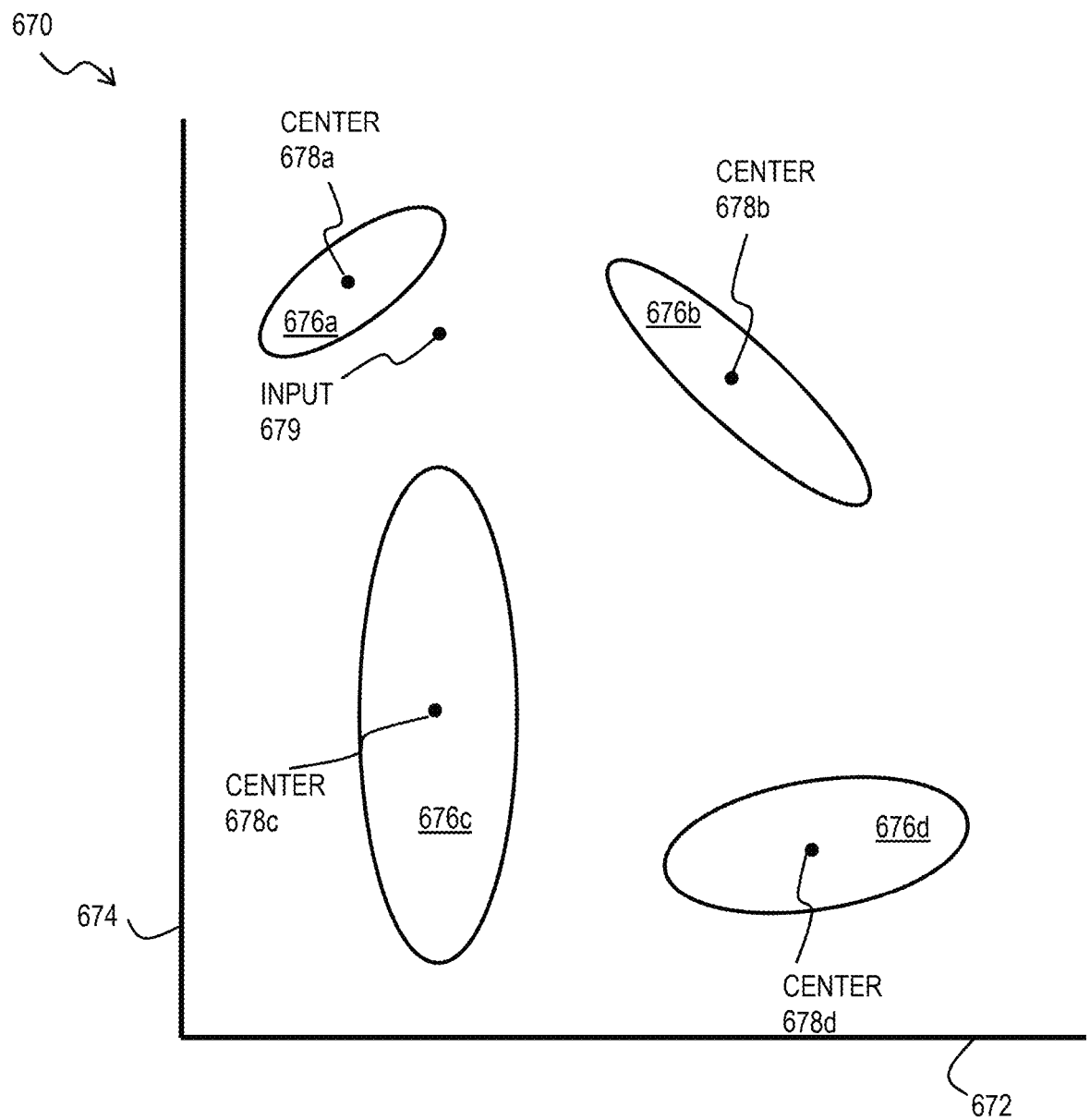
FIG. 6E is a graph that illustrates an example of a plurality of clusters and cluster centers associated with a respective plurality of classes, according to an embodiment.

A large number of covariance matrices C are assembled during training, for a respective large number of point clouds associated with each of a predetermined fixed number (N) of classes. This large number of covariance matrices C are arranged in a predetermined fixed number of clusters associated with the predetermined fixed number (N) of classes, as disclosed in Salehian 2013. A center of each cluster is selected to represent the cluster and a covariance matrix C associated with the cluster center is selected to represent the class associated with the cluster. In an embodiment, this compresses the training data by reducing the number of covariance matrices to be compared with an input covariance matrix, from the initial large number of covariance matrices to the reduced number equal to the number of classes. FIG. 6E is a graph 670 that illustrates an example of a plurality of clusters 676a, 676b, 676c, 676d and corresponding cluster centers 678a, 678b, 678c, 678d, respectively, according to an embodiment. In this embodiment, the cluster centers 678a, 678b, 678c, 678d are each associated with a respective object class. For purposes of simplicity, FIG. 6E depicts four clusters associated with four classes in a two dimensional space. However, the fixed number (N) of classes may be greater than four classes, such as 10 or 100, for example, and the cluster space may have more than two dimensions in typical embodiments. The horizontal axis 672 is a first parameter and the vertical axis 674 is a second parameter. The two-dimensional space in FIG. 6E is representative of a space where the clustering occurs.

A covariance matrix C associated with each cluster center 678a, 678b, 678c, 678d is compared with test data input of a covariance matrix C. In some embodiments, a distance is computed between the input covariance matrix C and each cluster center matrix C. In an embodiment, a geodesic distance is computed between the matrices using the Jensen-Bregman LogDet divergence operation, as disclosed in Salehian 2013. FIG. 6E depicts the data input 679 associated with the input covariance matrix C. In some embodiments, a k-d tree NN search is performed to determine which of the cluster centers 678a, 678b, 678c, 678d is the most proximate to the data input 679. In this embodiment, cluster center 678a is the most proximate to the data input 679 and thus the object used to generate the input covariance matrix C is classified based on the class associated with cluster 676a. In some embodiments, the NN search between the data input 679 and each cluster center is performed in about real-time or near-real time.

In some embodiments, a covariance matrix C is assembled for each point of the point cloud. In an embodiment, a subset of these covariance matrices C is compared with the covariance matrices associated with the cluster centers, in order to classify the object used to generate the point cloud. In another embodiment, if a majority of the subset of these covariance matrices is associated with one object class, the object is assigned this object class. In an example embodiment, if 1000 covariance matrices are assembled for 1000 points or 1000 segments of a point cloud, then a subset (e.g. 50) of the covariance matrices are compared with the covariance matrices associated with the cluster centers. In this example embodiment, if a majority (e.g. 30) of the subset of the covariance matrices is associated with one object class, then the object is classified according to this object class.

FIG. 7 is a flow chart that illustrates an example method for classifying an object defined by a 3D point cloud, according to an embodiment. Although steps are depicted in FIG. 7 as integral steps in a particular order for purposes of illustration, in other embodiments, one or more steps, or portions thereof, are performed in a different order, or overlapping in time, in series or in parallel, or are omitted, or one or more additional steps are added, or the method is changed in some combination of ways.

In step 701, a 3D point cloud representing an external surface of an object is obtained. In some embodiments, the 3D point cloud is generated using the system 200 of FIG. 2 or systems 300a, 300b of FIG. 3A and FIG. 3B. In other embodiments, the 3D point cloud is generated using any 3D scanner appreciated by one of ordinary skill in the art. In still other embodiments, the 3D point cloud is obtained from an external system and downloaded from an external source associated with the system or retrieved from storage on a local or remote storage device. In one embodiment, the 3D point cloud is obtained from an object or target in the system 200 of FIG. 2 or systems 300a, 300b of FIGS. 3A and 3B that is located at a minimum range, such as 400 meters (m).

In step 702 the surface normal 602 is extracted at the point 601 on the point cloud 600. In one embodiment, the surface normal 602 is extracted using the approximation from Klasing 2009 based on an eigenvector associated with a smallest eigenvalue that indicates a direction of minimal variance of neighbor points 605. In other embodiments, the surface normal 602 is extracted using another method. In one embodiment, the surface normal 602 is extracted for at least one point for each segment over the point cloud 600.

The surface normal 602 defines the translational and rotational invariant coordinate system at the point 601 based on the surface normal 602 and the plane 655 that is orthogonal to the surface normal 602 (and, therefore, is tangent to the object surface).

In step 704, values for one or more feature variables are extracted in the translational and rotational invariant coordinate system for at least one point 605 in every segment of the point cloud 600. In an example embodiment, values for the feature variables are extracted for each point 605 in each segment 607 of the point cloud 600.

In step 705, a first classification statistic is computed for at least one point 605 in the point cloud 600 based on the extracted feature variables in step 704. In one embodiment, the first classification statistic is the spin image 680 that is based on extracted values of one or more features ($\alpha$, $\beta$) from step 704. In one embodiment, the spin image 680 is obtained for each segment 607 of the point cloud 600 and thus multiple spin images 680 are obtained over the multiple segments 607 that span the point cloud 600.

In step 707, a second classification statistic is computed for each point 605 in at least one segment of the point cloud 600 based on the extracted values of the feature variables in step 704. In one embodiment, the second classification statistic is the covariance matrix C of equation 5. In some embodiments, a covariance matrix C is assembled for each point in each segment of the point cloud.

In step 709, a closest match is determined between the first classification statistic of step 705 and a set of first classification statistics for a corresponding set of N classes in about real-time or near real-time. This closest match is then used to estimate that the object generating the point cloud 600 is in a first class. In some embodiments, it is possible for the first classification statistic to not match any of the N classes. For example, the point cloud may represent an object that is not of interest, such as table setting when the objects of interest are vehicles and roadside structures. In these embodiments, in step 709, it is estimated that the object generating the point cloud is not in any of the N classes. This amounts to a negative classification (e.g. the object is not in any of the N classes) which is advantageous in various applications, particularly where the N classes encompassing objects of interest are known. In some embodiments, it is advantageous to know if an object is "unknown" (e.g. is not in any of the pre-defined N classes) such that the associated point cloud data is stored for further analysis and training if it were deemed by the user to be of interest. In an example embodiment, a label such as "unknown weapon" is used to update the training library of point clouds so that it is available to become a known target or class upon further training.

In an embodiment, in step 709, the spin image 680 from step 705 is represented by the vector equal to the number of bins 686 in the spin image 680. Additionally, in an embodiment, in step 709, the set of labeled spin images associated with a set of known classes is trained using LDA. In one embodiment, a dimensionality reduction step is performed in about real-time or near real-time, on the spin image 680 from a high dimension (e.g. number of bins 686) to a lower dimension (e.g. N−1) using projection vectors acquired during LDA. In an embodiment, a k-d tree and NN search is performed in about real-time or near-real time, to assign the object to membership in a first class. In an embodiment, the number (N) of the set of known classes and consequently the number of the set of first classification statistics is limited to a maximum threshold. In one example embodiment, N is less than or equal to 10. In another example embodiment, N is less than or equal to 100. In one embodiment, step 709 is performed in about real-time or near real-time as a result of the dimensional reduction of the spin image 680 vector and resulting k-d tree NN search in the reduced dimensional space.

In step 711, a closest match is determined between the second classification statistic of step 707 and a set of second classification statistics for a set of N classes in about real-time or in near real-time. This closest match is then used to estimate that the object generating the point cloud 600 is in a second class. In some embodiments, it is possible for the second classification statistic to not match any of the N classes. For example, the point cloud may represent an object that is not of interest, such as table setting when the objects of interest are vehicles and roadside structures. In these embodiments, in step 711, it is estimated that the object generating the point cloud is not in any of the N classes. This amounts to a negative classification (e.g. the object is not in any of the N classes) which is advantageous in various applications, particularly where the N classes encompassing objects of interest are known.

In an embodiment, in step 711, prior to a data capture period, a large number of covariance matrices C are assembled and associated with a fixed number (N) of classes. This large number of covariance matrices C are arranged in a fixed number of clusters based on the fixed number (N) of classes, as disclosed in Salehian 2013. A center of each cluster is selected to represent each cluster and a covariance matrix associated with the cluster center is selected to represent each class. In an embodiment, in step 711, a distance is computed in about real-time or in near-real-time between a covariance matrix C from test data input and the covariance matrices associated with each class. In an example embodiment, k-d tree NN searching is used to determine the nearest neighbor to the covariance matrix C in about real-time or near real-time. The object is assigned to a second class associated with the closest cluster center. In an embodiment, the number (N) of the set of known classes and consequently the number of cluster centers is limited to a maximum threshold. In one example embodiment, N is less than or equal to 10. In another example embodiment, N is less than or equal to 100. In one embodiment, step 711 is performed in about real-time or near real-time as a result of the reduction of the covariance matrices C to the fixed number of clusters and resulting k-d tree NN search based on this fixed number of clusters.

In step 713, the first class from step 709 is compared to the second class from step 711. If the first class is the same as the second class, then the method moves to step 715 where the object is assigned to the first class. If the first class is not the same as the second class, then the method moves to step 717. In other embodiments, if step 709 estimates that the object is not in any of the N classes and if step 711 estimates that the object is not in any of the N classes, then the method does not assign any of the N classes to the object. In one embodiment, the method outputs on a display that the object is not in any of the N classes. In another embodiment, the method operates a device based on the object not being in any of the N classes.

In some embodiments, where one of step 709 or step 711 concludes that the object is not in any of the N classes and the other of step 709 or step 711 concludes that the object is in one of the N classes, step 713 concludes that the classifications in steps 709 and 711 do not agree and thus the method moves to step 717. However, in these embodiments, as discussed below, in step 717, a closest fit is performed between the point cloud and a model point cloud for only the single class identified in one of step 709 or step 711 that identified the object in one of the N classes.

In step 717, a third classification statistic is computed in about real-time or near real-time for each point cloud 600 based on a closest fit between the point cloud 600 and one or more predetermined occluded or non-occluded model point clouds for the first and second classes only. None of the other N−2 classes is considered. In one embodiment, step 717 is performed in about real-time or near real-time as a result of the restriction of the closest fit to only model point clouds for the first class and second class.

This offers an advantage of saving valuable time for this method which can be the most time consuming classifier, e.g., involving the most computations. The number of computations is related to the number of points in the point cloud times the number of models which is N times the number of surfaces to define each of the N classes. In one embodiment, the third classification statistic is an iterative closest point (ICP) classification statistic as disclosed in Besl 1992. Step 717 is used to determine in about real-time or near real-time which class (e.g. first class or second class) is a better fit for the object generating the point cloud 600. In some embodiments, in step 717 the closest fit is only performed between the point cloud 600 and predetermined model point clouds for the first and second classes.

Figure 10A:
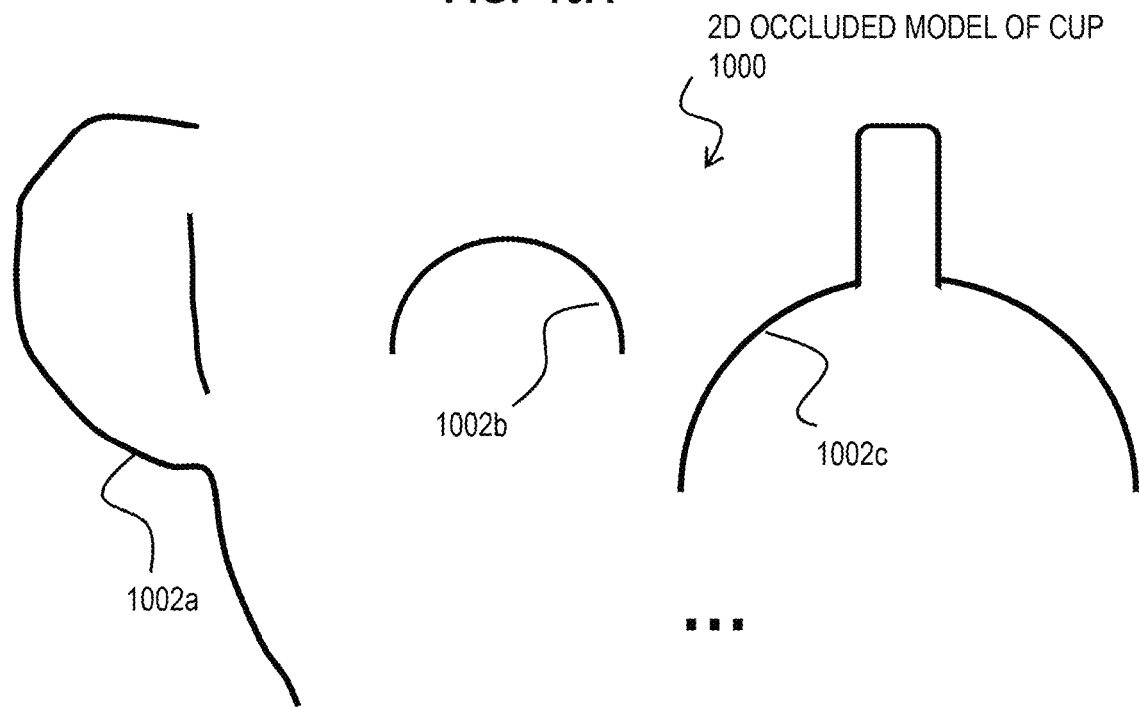
FIG. 10A is a block diagram that illustrates an example of an occluded model of an object based on the 3D point cloud of the object in FIG. 4, according to an embodiment.

In some embodiments, in step 717, model point clouds are obtained for the first and second class. In one embodiment, the model point cloud is obtained occluding those portions of the point cloud that are not observable from each perspective. FIG. 10A is a block diagram that illustrates an example of an occluded model 1000 of the object based on the 3D point cloud 400 of the object in FIG. 4, according to an embodiment. In this example embodiment, occluded model 1002a is obtained on an elevation view of the handle portion of the cup. Those portions of the cup (e.g. far side of the cup) not observable in that perspective are omitted in the occluded model 1002a. Similarly, occluded models 1002b, 1002c are obtained on a plan view of the rim portion of the cup near the top where the diameter is greater and the handle is present and near the bottom of the cup, where the diameter is less and there is no handle. Those portions of the cup (e.g. back side of the cup) are not observable in these perspectives and are omitted in the occluded models 1002b, 1002c. In a similar manner, occluded model point clouds are obtained of the first and second classes, using a 3D point cloud of the first and second classes. In some embodiments, the occluded model point clouds are generated using a master point cloud of the object which is randomly rotated and then converted to spherical coordinates. In this coordinate system, the closest point in range was selected for all occupied angle patches. Each angle patch has an empirically chosen extent (e.g. 0.001 degrees×0.001 degrees) which is converted back to Cartesian coordinates to constitute an instance of possible occlusion. These sub-models of model 1000 would be used in step 717 if one class of the two different classes determined in steps 709 and 711 were a cup and the second class were different, e.g., a platter.

Figure 10B:
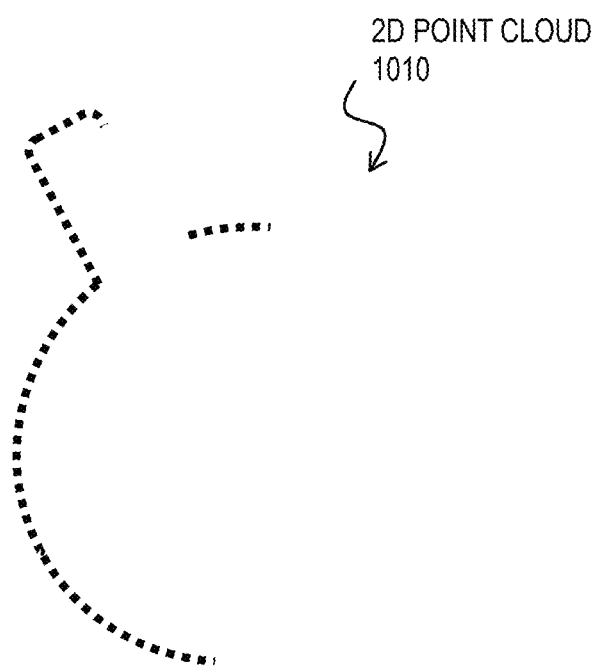
FIG. 10B is a block diagram that illustrates an example of a 2D point cloud of an object, according to an embodiment.
Figure 10C:
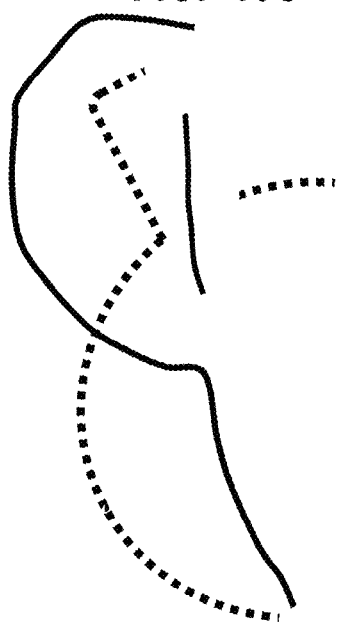
FIGS. 10C-10E is a block diagram that illustrates an example of a best fit between the 2D point cloud of FIG. 10B and each occluded model of FIG. 10A, according to an embodiment.
Figure 10D:
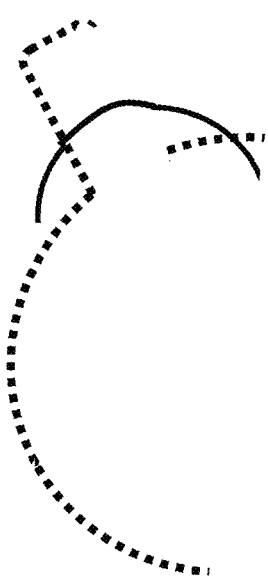
Figure 10E:
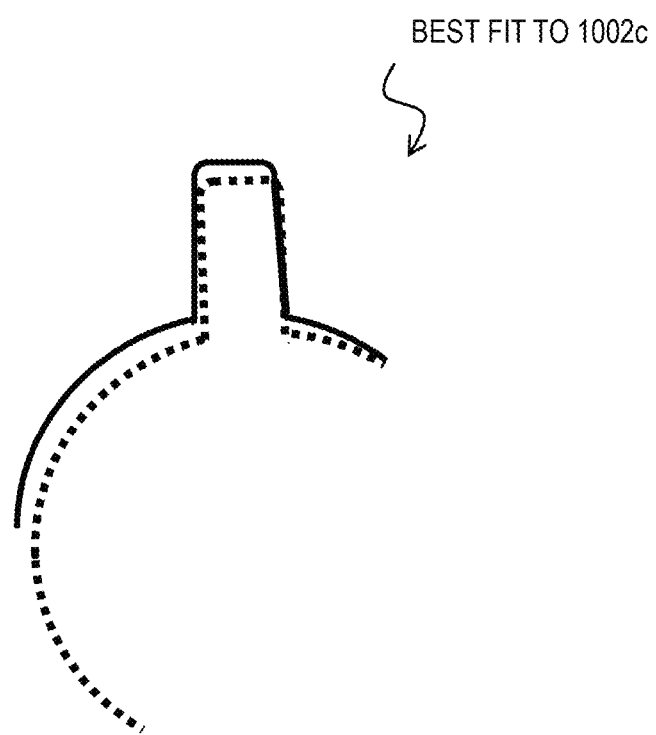

In some embodiments, in step 717, the closest fit is performed between a test input point cloud and the model point clouds associated with the first and second classes, in order to determine whether or not the object should be classified in the first or second class. FIG. 10B is a block diagram that illustrates an example of a 2D test point cloud 1010 of an object, according to an embodiment. The 2D point cloud 1010 is a test input point cloud that will be compared to each model point cloud of FIG. 10A, using a closest fit. The 2D point cloud is rotated and translated to best fit each model for the class. FIGS. 10C-10E are block diagrams that illustrate an example of a closest fit between the 2D point cloud 1010 of FIG. 10B and each occluded model 1002a, 1002b, 1002c of FIG. 10A, according to an embodiment. In each closest fit, the test input point cloud (e.g. 1010) is rotated, translated and/or scaled relative such that a minimum distance is obtained between points on the model point cloud and points on the test input point cloud, as disclosed in Besl 1992. The fit with the smallest minimum distance is designated as the closest fit. If the closest fit is too large, e.g., the mean square distance between points in the test input point cloud and points in the model point cloud for a minimum ratio of closest points between the point clouds is above a threshold square distance, then the object is considered not to belong to the class. In an example embodiment, if the mean square distance between points in the test input point cloud and points in the model point cloud for the top 90% of closest points between the point clouds is above 2 $cm^2$, the object is considered not to belong to the class.

In the example embodiment of FIG. 10C, the best fit between the model point cloud 1002a and model point 1010 results in a relatively large average distance (or root mean square distance) between the point clouds. In the example embodiment of FIG. 10D, the best fit between the model point cloud 1002b and model point 1010 results in a smaller average distance or root mean square distance (relative to FIG. 10C) between the point clouds. In the example embodiment of FIG. 10E, the best fit between the model point cloud 1002c and model point 1010 results in the smallest average or root mean square distance between the point clouds. If this distance is acceptably small, the 2D point cloud 1010 is successfully classified as a cup.. Similarly the point cloud 1010 would be compared to a model of the second class of objects determined in step 711, such as a platter with several occluded sub-models. If the best fit of the platter sub-models has a larger average or root mean square distance, then the object would be classified as a cup and not a platter.

In some embodiments, where one of step 709 or step 711 concludes that the object is not in any of the N classes and the other of step 709 or step 711 concludes that the object is in one of the N classes, then the closest fit in step 717 is performed between the test input point cloud and the model point cloud for only the single class associated with step 709 or step 711 that concludes the object is in one of the N classes. In these embodiments, if the smallest average or root mean square distance is acceptably small, then the object is classified with the same classification as the single class associated with step 709 or step 711 that concludes the object is in one of the N classes. In these embodiments, if the smallest average or root mean square distance is not acceptably small, then the object is not classified in any of the N classes.

In step 719, the object is assigned to the first or second class, depending on which class results in the closest fit with the input point cloud in step 717.

In step 721, after the object is assigned a class, a device is operated based on the assigned object class. In some embodiments, this involves presenting an image on a display device that indicates the assigned class or information based on the assigned class. In some embodiments, this involves communicating, to the device, data that identifies the assigned object class. In other embodiments, this involves impelling a projectile along a trajectory to the object. In an example embodiment, the projectile is a missile. In some embodiments, the device is a controlled vehicle, and based on the object, the vehicle is controlled to avoid collision with the object or controlled to not avoid collision with the object.

6. EXAMPLE EMBODIMENTS

In these example embodiments, the LIDAR system used components illustrated above to produce simultaneous up and down chirp transmitted signals. This system is commercially available as HRS-3D from BLACKMORE SENSORS AND ANALYTICS, INC.™ of Bozeman.

Figure 8A:
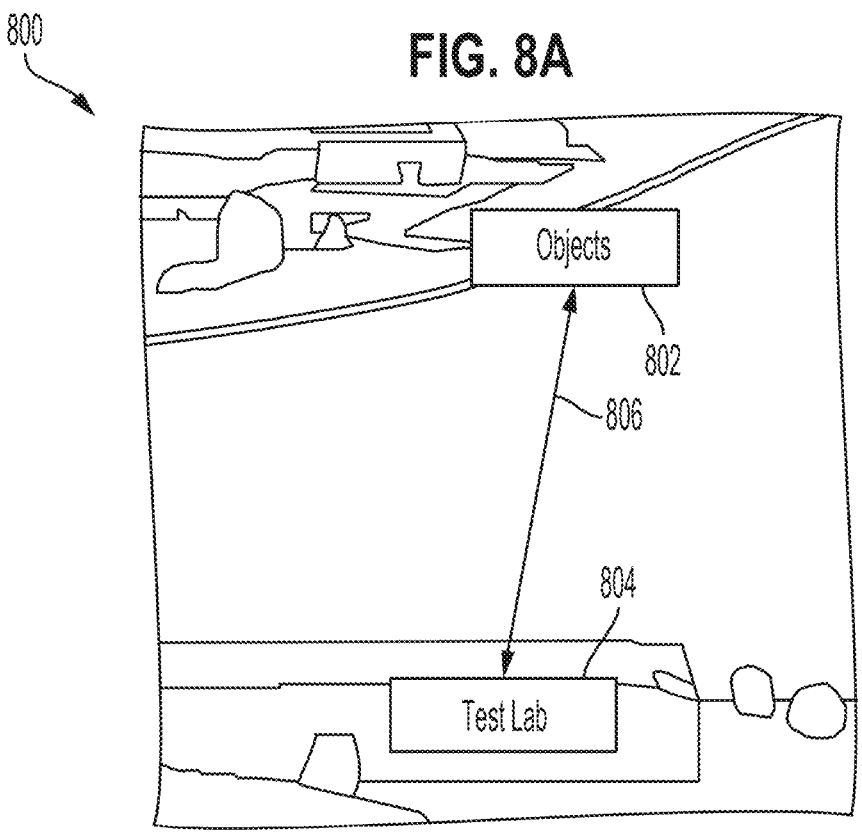
FIG. 8A is a photograph that illustrates an example of a top perspective view of an experimental setup of the system of FIG. 2, according to embodiments.
Figure 8B:
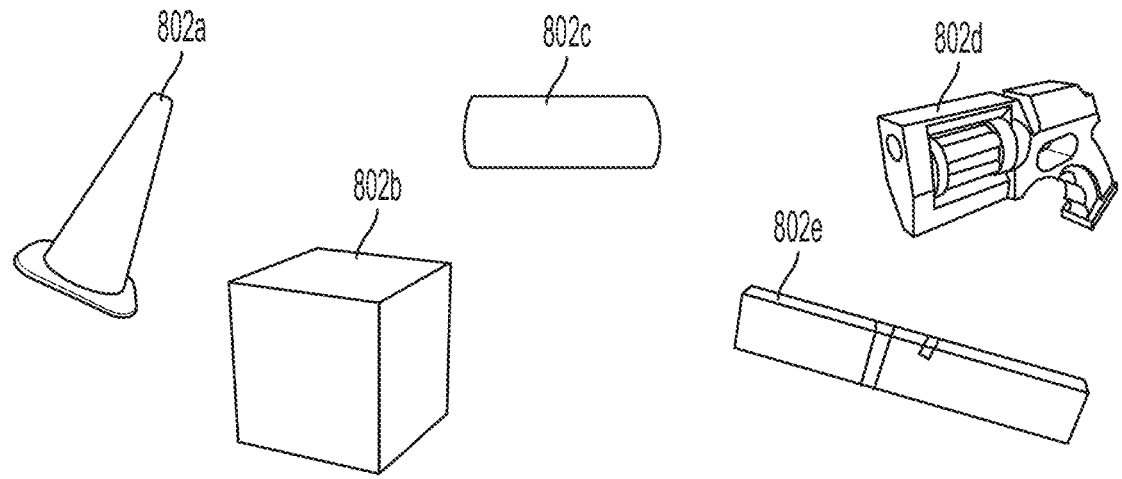
FIG. 8B is a block diagram that that illustrate an example of objects used in the experimental setup depicted in FIG. 8A, according to an embodiment.

FIG. 8A is a photograph 800 that illustrates an example of a top perspective view of an experimental setup of the system 200 of FIG. 2 or system 300 of FIG. 3A or FIG. 3B, according to embodiments. In an embodiment, the objects 802 are spaced apart from the LIDAR system in a test lab 804 by a range 806. In an example embodiment, the range 806 is between 400 meters (m) and 2000 meters (m), for example. FIG. 8B is a block diagram that that illustrates an example of objects 802 used in the experimental setup depicted in FIG. 8A, according to an embodiment. These objects 802 include a cone 802a, a box 802b, a pipe 802c, a pistol 802d and a box 802e, representing N=5 object classes of interest. A point cloud dissimilar form all these objects, using any similarity measure and an associated threshold similarity value, is not an object of interest. Table 1 below depicts a matrix where the actual object class (vertical column) is compared with the predicted object class (horizontal row) using the method 700 of FIG. 7. The sum of all values in a row is 100%. In an example embodiment, the method 700 predicted that a 3D point cloud of the cone is in the cone class 100% of the time; that a 3D point cloud of the cube is in the cube class 100% of the time; that a 3D point cloud of the pipe is in the pipe class 96% of the time and in the pistol class 4% of the time; that a 3D point cloud of the box is in the cube class 2% of the time, in the pipe class 2% of the time and is in the box class 96% of the time; and predicted that a 3D point cloud of the pistol is in the cone class 1% of the time, in the pipe class 10% of the time and is in the pistol class 89% of the time.

TABLE 1

| | Cone | Cube | Pipe | Box | Pistol |
|---|---|---|---|---|---|
| Cone | 100 | | | | |
| Cube | | 100 | | | |
| Pipe | | | 96 | | 4 |
| Box | | 2.1 | 2.1 | 95.8 | |
| Pistol | 1.1 | | 9.5 | | 89.4 |

Figure 9A:
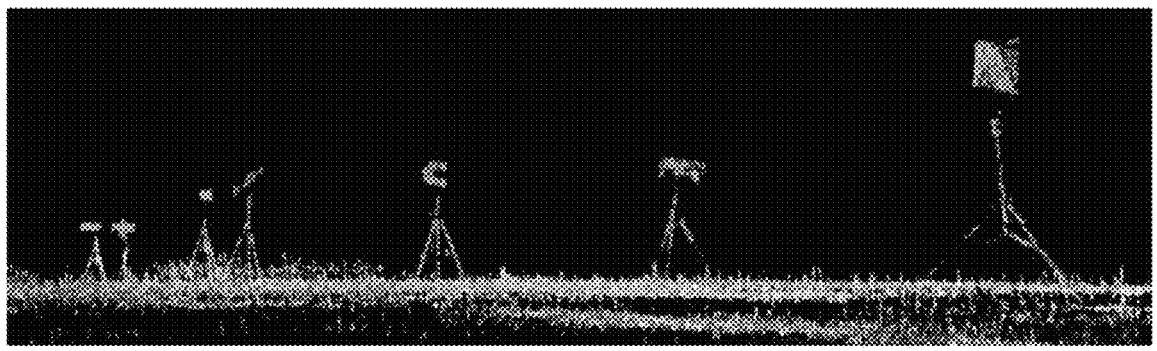
FIG. 9A is a set of point clouds for a set of objects, according to an embodiment.
Figure 9B:
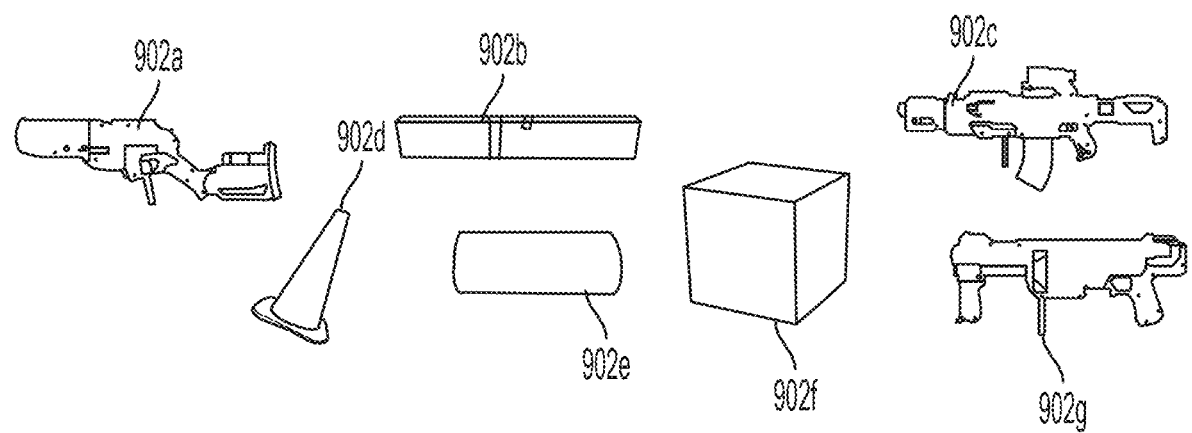
FIG. 9B is a block diagram that illustrates an example of the set of objects used to obtain the set of point clouds of FIG. 9A, according to an embodiment.

FIG. 9A is a set of point clouds 900 for a set of objects, according to an embodiment. FIG. 9B is a block diagram that illustrates an example of the set of objects 902 used to obtain the set of point clouds 900 of FIG. 9A according to an embodiment. The objects 902 are more similar in shape and size than the objects 802. For example, the three toy guns 902a, 902c, 902g, look similar. The objects 902 include a toy gun 902a ("Sledge" in Table 2), a box 902b, a toy gun 902c ("Mod" in Table 2), a cone 902d, a pipe 902e, a cube 902f, and a toy gun 902g ("Roto" in Table 2).

In one embodiment, the objects 902 are positioned in an experimental setup that is similar to that depicted in FIG. 8A. Table 2 below depicts a matrix where the actual object class (vertical column) is compared with the predicted object class (horizontal row), according to the method 700 of FIG. 7. Again the sum of all columns in each row is 100%. In an example embodiment, the method 700 predicted that a 3D point cloud of the cone is in the cone class 100% of the time; that a 3D point cloud of the cube is in the cube class 100% of the time; that a 3D point cloud of the pipe is in the pipe class 100% of the time; that a 3D point cloud of the mod toy gun is in the cube class 1% of the time, in the mod class 92% of the time, in the roto class 6% of the time and is in the sledge class 1% of the time; that a 3D point cloud of the roto toy gun is in the pipe class 3% of the time and in the roto class 97% of the time; that a 3D point cloud of the box is in the pipe class 5% of the time, in the mod class 1% of the time, in the box class 93% of the time and is in the sledge class 1% of the time; and that a 3D point cloud of the sledge toy gun is in the pipe class 3% of the time, in the box class 10% of the time and is in the sledge class 87% of the time.

TABLE 2

| | Cone | Cube | Pipe | Mod | Roto | Box | Sledge |
|---|---|---|---|---|---|---|---|
| Cone | 100 | | | | | | |
| Cube | | 100 | | | | | |
| Pipe | | | 100 | | | | |
| Mod | | 1 | | 92 | 6 | | 1 |
| Roto | | | 3 | | 97 | | |
| Box | | | 5 | 1 | | 93 | 1 |
| Sledge | | | 3 | | | 10 | 87 |

Based on the results of Table 2, the method 700 maintained strong class predictions, despite a more challenging object set that are more similar in size and shape.

7. COMPUTATIONAL HARDWARE OVERVIEW

Figure 11:
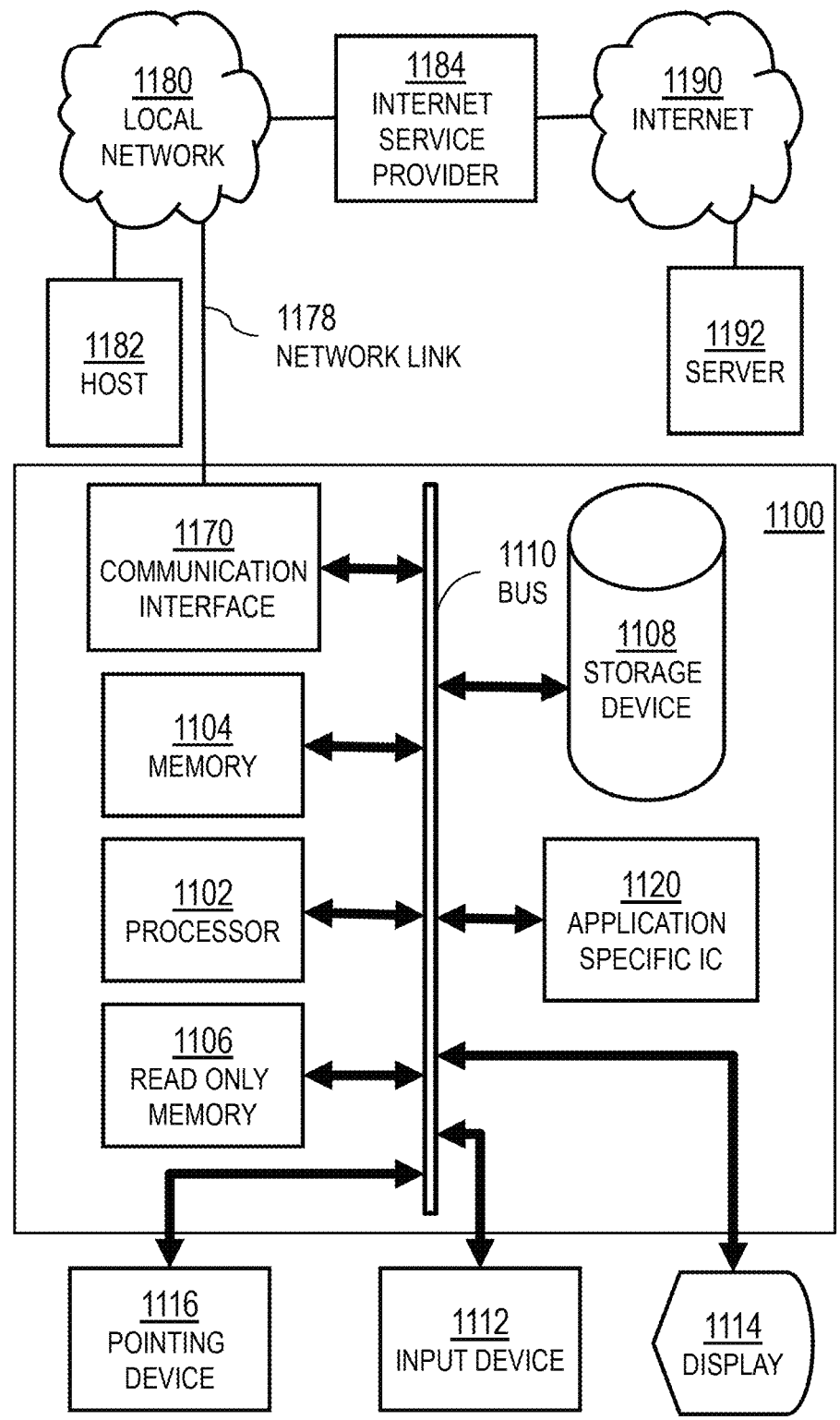
FIG. 11 is a block diagram that illustrates a computer system upon which an embodiment of the invention may be implemented.

FIG. 11 is a block diagram that illustrates a computer system 1100 upon which an embodiment of the invention may be implemented. Computer system 1100 includes a communication mechanism such as a bus 1110 for passing information between other internal and external components of the computer system 1100. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit.). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1100, or a portion thereof, constitutes a means for performing one or more steps of one or more methods described herein.

A sequence of binary digits constitutes digital data that is used to represent a number or code for a character. A bus 1110 includes many parallel conductors of information so that information is transferred quickly among devices coupled to the bus 1110. One or more processors 1102 for processing information are coupled with the bus 1110. A processor 1102 performs a set of operations on information. The set of operations include bringing information in from the bus 1110 and placing information on the bus 1110. The set of operations also typically include comparing two or more units of information, shifting positions of units of information, and combining two or more units of information, such as by addition or multiplication. A sequence of operations to be executed by the processor 1102 constitutes computer instructions.

Computer system 1100 also includes a memory 1104 coupled to bus 1110. The memory 1104, such as a random access memory (RAM) or other dynamic storage device, stores information including computer instructions. Dynamic memory allows information stored therein to be changed by the computer system 1100. RAM allows a unit of information stored at a location called a memory address to be stored and retrieved independently of information at neighboring addresses. The memory 1104 is also used by the processor 1102 to store temporary values during execution of computer instructions. The computer system 1100 also includes a read only memory (ROM) 1106 or other static storage device coupled to the bus 1110 for storing static information, including instructions, that is not changed by the computer system 1100. Also coupled to bus 1110 is a non-volatile (persistent) storage device 1108, such as a magnetic disk or optical disk, for storing information, including instructions, that persists even when the computer system 1100 is turned off or otherwise loses power.

Information, including instructions, is provided to the bus 1110 for use by the processor from an external input device 1112, such as a keyboard containing alphanumeric keys operated by a human user, or a sensor. A sensor detects conditions in its vicinity and transforms those detections into signals compatible with the signals used to represent information in computer system 1100. Other external devices coupled to bus 1110, used primarily for interacting with humans, include a display device 1114, such as a cathode ray tube (CRT) or a liquid crystal display (LCD), for presenting images, and a pointing device 1116, such as a mouse or a trackball or cursor direction keys, for controlling a position of a small cursor image presented on the display 1114 and issuing commands associated with graphical elements presented on the display 1114.

In the illustrated embodiment, special purpose hardware, such as an application specific integrated circuit (IC) 1120, is coupled to bus 1110. The special purpose hardware is configured to perform operations not performed by processor 1102 quickly enough for special purposes. Examples of application specific ICs include graphics accelerator cards for generating images for display 1114, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1100 also includes one or more instances of a communications interface 1170 coupled to bus 1110. Communication interface 1170 provides a two-way communication coupling to a variety of external devices that operate with their own processors, such as printers, scanners and external disks. In general the coupling is with a network link 1178 that is connected to a local network 1180 to which a variety of external devices with their own processors are connected. For example, communication interface 1170 may be a parallel port or a serial port or a universal serial bus (USB) port on a personal computer. In some embodiments, communications interface 1170 is an integrated services digital network (ISDN) card or a digital subscriber line (DSL) card or a telephone modem that provides an information communication connection to a corresponding type of telephone line. In some embodiments, a communication interface 1170 is a cable modem that converts signals on bus 1110 into signals for a communication connection over a coaxial cable or into optical signals for a communication connection over a fiber optic cable. As another example, communications interface 1170 may be a local area network (LAN) card to provide a data communication connection to a compatible LAN, such as Ethernet. Wireless links may also be implemented. Carrier waves, such as acoustic waves and electromagnetic waves, including radio, optical and infrared waves travel through space without wires or cables. Signals include man-made variations in amplitude, frequency, phase, polarization or other physical properties of carrier waves. For wireless links, the communications interface 1170 sends and receives electrical, acoustic or electromagnetic signals, including infrared and optical signals, that carry information streams, such as digital data.

The term computer-readable medium is used herein to refer to any medium that participates in providing information to processor 1102, including instructions for execution. Such a medium may take many forms, including, but not limited to, non-volatile media, volatile media and transmission media. Non-volatile media include, for example, optical or magnetic disks, such as storage device 1108. Volatile media include, for example, dynamic memory 1104. Transmission media include, for example, coaxial cables, copper wire, fiber optic cables, and waves that travel through space without wires or cables, such as acoustic waves and electromagnetic waves, including radio, optical and infrared waves. The term computer-readable storage medium is used herein to refer to any medium that participates in providing information to processor 1102, except for transmission media.

Common forms of computer-readable media include, for example, a floppy disk, a flexible disk, a hard disk, a magnetic tape, or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read. The term non-transitory computer-readable storage medium is used herein to refer to any medium that participates in providing information to processor 1102, except for carrier waves and other signals.

Logic encoded in one or more tangible media includes one or both of processor instructions on a computer-readable storage media and special purpose hardware, such as ASIC 1120.

Network link 1178 typically provides information communication through one or more networks to other devices that use or process the information. For example, network link 1178 may provide a connection through local network 1180 to a host computer 1182 or to equipment 1184 operated by an Internet Service Provider (ISP). ISP equipment 1184 in turn provides data communication services through the public, world-wide packet-switching communication network of networks now commonly referred to as the Internet 1190. A computer called a server 1192 connected to the Internet provides a service in response to information received over the Internet. For example, server 1192 provides information representing video data for presentation at display 1114.

The invention is related to the use of computer system 1100 for implementing the techniques described herein. According to one embodiment of the invention, those techniques are performed by computer system 1100 in response to processor 1102 executing one or more sequences of one or more instructions contained in memory 1104. Such instructions, also called software and program code, may be read into memory 1104 from another computer-readable medium such as storage device 1108. Execution of the sequences of instructions contained in memory 1104 causes processor 1102 to perform the method steps described herein. In alternative embodiments, hardware, such as application specific integrated circuit 1120, may be used in place of or in combination with software to implement the invention. Thus, embodiments of the invention are not limited to any specific combination of hardware and software.

The signals transmitted over network link 1178 and other networks through communications interface 1170, carry information to and from computer system 1100. Computer system 1100 can send and receive information, including program code, through the networks 1180, 1190 among others, through network link 1178 and communications interface 1170. In an example using the Internet 1190, a server 1192 transmits program code for a particular application, requested by a message sent from computer 1100, through Internet 1190, ISP equipment 1184, local network 1180 and communications interface 1170. The received code may be executed by processor 1102 as it is received, or may be stored in storage device 1108 or other non-volatile storage for later execution, or both. In this manner, computer system 1100 may obtain application program code in the form of a signal on a carrier wave.

Various forms of computer readable media may be involved in carrying one or more sequence of instructions or data or both to processor 1102 for execution. For example, instructions and data may initially be carried on a magnetic disk of a remote computer such as host 1182. The remote computer loads the instructions and data into its dynamic memory and sends the instructions and data over a telephone line using a modem. A modem local to the computer system 1100 receives the instructions and data on a telephone line and uses an infra-red transmitter to convert the instructions and data to a signal on an infra-red a carrier wave serving as the network link 1178. An infrared detector serving as communications interface 1170 receives the instructions and data carried in the infrared signal and places information representing the instructions and data onto bus 1110. Bus 1110 carries the information to memory 1104 from which processor 1102 retrieves and executes the instructions using some of the data sent with the instructions. The instructions and data received in memory 1104 may optionally be stored on storage device 1108, either before or after execution by the processor 1102.

Figure 12:
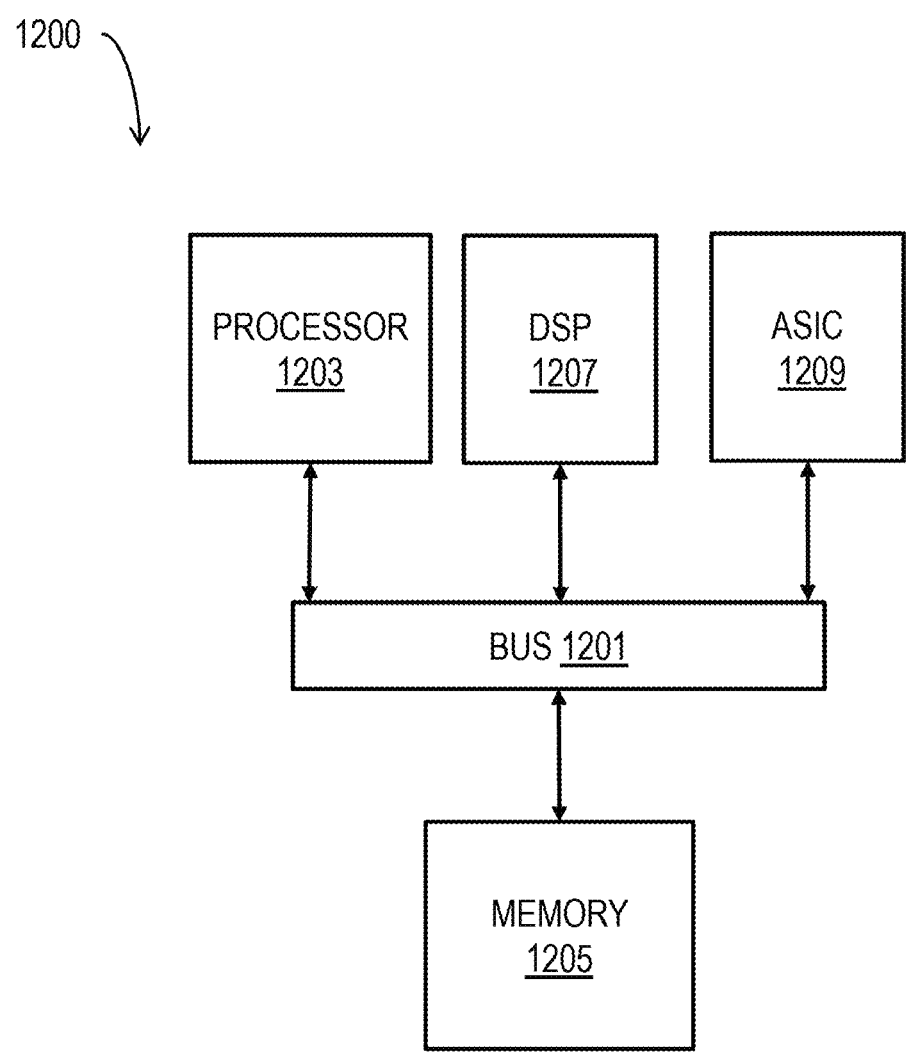
FIG. 12 illustrates a chip set upon which an embodiment of the invention may be implemented.

FIG. 12 illustrates a chip set 1200 upon which an embodiment of the invention may be implemented. Chip set 1200 is programmed to perform one or more steps of a method described herein and includes, for instance, the processor and memory components described with respect to FIG. 11 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 1200, or a portion thereof, constitutes a means for performing one or more steps of a method described herein.

In one embodiment, the chip set 1200 includes a communication mechanism such as a bus 1201 for passing information among the components of the chip set 1200. A processor 1203 has connectivity to the bus 1201 to execute instructions and process information stored in, for example, a memory 1205. The processor 1203 may include one or more processing cores with each core configured to perform independently. A multi-core processor enables multiprocessing within a single physical package. Examples of a multi-core processor include two, four, eight, or greater numbers of processing cores. Alternatively or in addition, the processor 1203 may include one or more microprocessors configured in tandem via the bus 1201 to enable independent execution of instructions, pipelining, and multithreading. The processor 1203 may also be accompanied with one or more specialized components to perform certain processing functions and tasks such as one or more digital signal processors (DSP) 1207, or one or more application-specific integrated circuits (ASIC) 1209. A DSP 1207 typically is configured to process real-world signals (e.g., sound) in real time independently of the processor 1203. Similarly, an ASIC 1209 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1203 and accompanying components have connectivity to the memory 1205 via the bus 1201. The memory 1205 includes both dynamic memory (e.g., RAM, magnetic disk, writable optical disk, etc.) and static memory (e.g., ROM, CD-ROM, etc.) for storing executable instructions that when executed perform one or more steps of a method described herein. The memory 1205 also stores the data associated with or generated by the execution of one or more steps of the methods described herein.

8. ALTERATIONS, EXTENSIONS AND MODIFICATIONS

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense. Throughout this specification and the claims, unless the context requires otherwise, the word "comprise" and its variations, such as "comprises" and "comprising," will be understood to imply the inclusion of a stated item, element or step or group of items, elements or steps but not the exclusion of any other item, element or step or group of items, elements or steps. Furthermore, the indefinite article "a" or "an" is meant to indicate one or more of the item, element or step modified by the article. As used herein, unless otherwise clear from the context, a value is "about" another value if it is within a factor of two (twice or half) of the other value. While example ranges are given, unless otherwise clear from the context, any contained ranges are also intended in various embodiments. Thus, a range from 0 to 10 includes the range 1 to 4 in some embodiments.

9. REFERENCES

Adany, P., C. Allen, and R. Hui, "Chirped Lidar Using Simplified Homodyne Detection," Jour. Lightwave Tech., v. 27 (16), 15 Aug., 2009.

P. J. Besl and N. D. McKay, "Method for registration of 3-D shapes," 1992, vol. 1611, pp. 586-606.

D. Fehr, A. Cherian, R. Sivalingam, S. Nickolay, V. Moreallas, and N. Papanikolopoulos, "Compact Covariance descriptors in 3D point clouds for object recognition," presented at the Robotics and Automation (ICRA), 2012 IEEE International Conference, pp. 1793-1798.

Hui, R., C. Allen, and P. Adany, "Coherent detection scheme for FM Chirped laser RADAR," U.S. Pat. No. 7,742,152, 22 Jun. 2010.

Andrew Johnson, "Spin-Images: A Representation for 3-D Surface Matching," doctoral dissertation, tech. report CMU-RI-TR-97-47, Robotics Institute, Carnegie Mellon University, August, 1997.

Kachelmyer, A. L., "Range-Doppler Imaging with a Laser Radar," The Lincoln Laboratory Journal, v. 3. (1), 1990.

K. Klasing, D. Althoff, D. Wollher and M. Buss, "Comparison of Surface Normal Estimation Methods for Range Sensing Applications," in Proceedings of the 2009 IEEE International Conference on Robotics and Automation, Piscataway, NJ, USA, 2009, p. 1977-1982.

H. Salehian, G. Cheng, B. C. Vemuri and J. Ho, "Recursive Estimation of the Stein Center of SPD Matrices and Its Applications," in 2013 IEEE International Conference on Computer Vision (ICCV), 2013, pp. 1793-1800.

J. Ye, "Least Squares Linear Discriminant Analysis," Proceedings of the 24$^{th}$ International Conference on Machine Learning, p. 1087-1093.

What is claimed is:

1. A light detection and ranging (LIDAR) sensor system for a vehicle, comprising:
    a sensor configured to:
        transmit a transmit beam, the transmit beam having at least one of a frequency or a phase that is modulated over time;
        receive a return beam from reflection or scattering of the transmit beam by an object; and
        output a data signal comprising at least one point cloud data point representing the object; and
    one or more processors configured to:
        determine at least one feature variable based on the at least one point cloud data point;
        determine a first classification statistic based on the at least one feature variable;
        determine a second classification statistic based on the at least one feature variable; and
        determine an object class corresponding to the object based on the first classification statistic and the second classification statistic.

2. The LIDAR sensor system of claim 1, wherein the sensor comprises:
    a laser source configured to output a carrier wave;
    a modulator configured to modulate the carrier wave to provide the carrier wave as the transmit beam; and
    one or more scanning optics configured to transmit the transmit beam.

3. The LIDAR sensor system of claim 2, wherein the modulator is configured to modulate the at least one of the phase or the frequency by applying modulation to a current driving the laser source.

4. The LIDAR sensor system of claim 2, wherein the modulator is an electro-optic modulator.

5. The LIDAR sensor system of claim 2, wherein the modulator is an acoustic-optic modulator.

6. The LIDAR sensor system of claim 1, wherein the transmit beam is a chirp signal.

7. The LIDAR sensor system of claim 1, wherein the sensor is further configured to output the data signal as a three-dimensional (3D) point cloud comprising the at least one point cloud data point.

8. The LIDAR sensor system of claim 7, wherein the sensor is configured to output the 3D point cloud for use as training data.

9. The LIDAR sensor system of claim 1, wherein the one or more processors are configured to determine the object class from a predetermined number of object classes.

10. The LIDAR sensor system of claim 1, wherein the one or more processors are configured to determine the object class from a vehicle class and a roadside structure class.

11. An autonomous vehicle control system, comprising:
    one or more processors configured to:
        receive a data signal comprising at least one point cloud data point representing an object;
        determine at least one feature variable based on the at least one point cloud data point;
        determine a first classification statistic based on the at least one feature variable;
        determine a second classification statistic based on the at least one feature variable;
        determine an object class corresponding to the object based on the first classification statistic and the second classification statistic; and
        generate a control signal to control operation of an autonomous vehicle based on the determined object class.

12. The autonomous vehicle control system of claim 11, wherein the data signal comprises a three-dimensional (3D) point cloud comprising the at least one point cloud data point.

13. The autonomous vehicle control system of claim 11, wherein the one or more processors are configured to determine the object class from a predetermined number of object classes.

14. The autonomous vehicle control system of claim 11, wherein the one or more processors are configured to determine the object class from a vehicle class and a roadside structure class.

15. A LIDAR sensor system for a vehicle, comprising:
    a laser source configured to generate a carrier wave having at least one of a frequency or a phase that is modulated over time;
    an optic configured to output the carrier wave as a transmit signal;
    one or more detectors configured to detect a return signal from reflection or scattering of the transmit signal by an object; and
    one or more processors configured to:
        determine a 3D point cloud representative of the object based on the return signal;
        determine at least one feature variable based on the 3D point cloud;
        determine a first classification statistic based on the at least one feature variable;
        determine a second classification statistic based on the at least one feature variable; and
        determine an object class corresponding to the object based on the first classification statistic and the second classification statistic.

16. The LIDAR sensor system of claim 15, further comprising a modulator configured to modulate the carrier wave to provide the carrier wave as the transmit beam.

17. The LIDAR sensor system of claim 16, wherein the modulator is configured to modulate the at least one of the phase or the frequency by changing a current driving the laser source.

18. The LIDAR sensor system of claim 16, wherein the modulator is an electro-optic modulator.

19. The LIDAR sensor system of claim 16, wherein the modulator is an acoustic-optic modulator.

20. The LIDAR sensor system of claim 15, wherein the one or more processors are configured to determine the object class from a vehicle class and a roadside structure class.

* * * * *